US008157910B2

(12) United States Patent
Stratton et al.

(10) Patent No.: US 8,157,910 B2
(45) Date of Patent: *Apr. 17, 2012

(54) HIGH SRI CEMENTITIOUS SYSTEMS FOR COLORED CONCRETE

(75) Inventors: Stanley G. Stratton, Hiram, GA (US); Phillip J. Arnold, Huntington Beach, CA (US); James K. Crawford, Atlanta, GA (US); Pritam S. Dhaliwai, Upland, CA (US)

(73) Assignee: L. M. Scofield Company, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/883,098

(22) Filed: Sep. 15, 2010

(65) Prior Publication Data

US 2011/0000401 A1  Jan. 6, 2011

Related U.S. Application Data

(63) Continuation of application No. 12/114,452, filed on May 2, 2008, now Pat. No. 7,815,728.

(51) Int. Cl.
*C04B 14/00* (2006.01)
*C04B 14/30* (2006.01)
(52) U.S. Cl. ......... 106/712; 252/587; 428/702; 428/703
(58) Field of Classification Search ................. 106/712; 252/587; 428/702, 703
See application file for complete search history.

(56) References Cited

U.S. PATENT DOCUMENTS

| | | | |
|---|---|---|---|
| 0,021,927 A | 10/1858 | Johnson | |
| 0,035,464 A | 6/1862 | Mosteller | |
| 0,080,368 A | 7/1868 | Snow et al. | |
| 0,092,358 A | 7/1869 | Quesnot | |
| 0,302,679 A | 7/1884 | Wynkoop | |
| 0,313,217 A | 3/1885 | Lesley | |
| 0,325,718 A | 9/1885 | Wynkoop | |
| 0,343,183 A | 6/1886 | Mathey | |
| 525,146 A | 8/1894 | Haddock | |
| 672,740 A | 4/1901 | Mayhew | |
| 932,280 A | 8/1909 | Horn | |
| 1,113,112 A | 10/1914 | Flesheim | |
| 1,314,810 A | 9/1919 | Johnson | |
| 1,453,457 A | 5/1923 | Haldeman | |
| 1,515,121 A | 11/1924 | Kaufman | |
| 1,982,541 A | 11/1934 | Scripture, Jr. | |
| 2,133,988 A | 10/1938 | Harshberger | |
| 2,275,272 A | 3/1942 | Scripture, Jr. | |
| 2,811,463 A | 10/1957 | Burgyan | |
| 3,102,039 A | 8/1963 | Manecke | |
| 3,577,379 A | 5/1971 | Sandler et al. | |
| 3,957,675 A | 5/1976 | Schutt | |
| 4,272,296 A | 6/1981 | Balducci et al. | |
| 4,289,677 A | 9/1981 | Supcoe et al. | |
| 4,424,292 A | 1/1984 | Ravinovitch et al. | |
| 4,624,710 A | 11/1986 | Modly | |
| 4,797,160 A | 1/1989 | Salyer | |
| 5,006,175 A | 4/1991 | Modly | |
| 5,811,180 A | 9/1998 | Berdahl | |
| 6,174,360 B1 | 1/2001 | Sliwinski et al. | |
| 6,416,868 B1 | 7/2002 | Sullivan et al. | |
| 6,454,848 B2 | 9/2002 | Sliwinski et al. | |
| 6,541,112 B1 | 4/2003 | Swiler et al. | |
| 6,726,864 B2 | 4/2004 | Nasr et al. | |
| 6,780,369 B1 | 8/2004 | Darrow et al. | |
| 6,786,965 B2 | 9/2004 | Perry et al. | |
| 6,989,056 B2 | 1/2006 | Babler | |
| 7,157,112 B2 | 1/2007 | Haines | |
| 7,198,668 B2 * | 4/2007 | Reisacher et al. ............ 106/499 |
| 7,815,728 B2 * | 10/2010 | Stratton et al. ................ 106/712 |
| 2004/0156986 A1 * | 8/2004 | Yadav ........................... 427/180 |
| 2004/0231567 A1 | 11/2004 | Dulzer et al. | |
| 2005/0074580 A1 | 4/2005 | Gross et al. | |
| 2005/0126441 A1 | 6/2005 | Skelhorn | |
| 2005/0142329 A1 | 6/2005 | Anderson et al. | |
| 2007/0022914 A1 | 2/2007 | Friedrich et al. | |

(Continued)

FOREIGN PATENT DOCUMENTS

EP   1914215 A1   4/2008

(Continued)

OTHER PUBLICATIONS

Ready Mixed Concrete Industry LEED Reference Guide, Ready Mixed Concrete (RMC) Research Foundation and the Portland Cement Association (PCA), Oct. 2005, updated for LEED version 2.2, 97 pages.

(Continued)

*Primary Examiner* — Anthony J Green
(74) *Attorney, Agent, or Firm* — Sheldon Mak & Anderson PC; Kristin C. Hibner

(57) ABSTRACT

IR reflective cementitious systems comprising one or more IR reflective pigments are provided. The cementitious systems of the invention may be in the form of mixtures which increase the total solar reflectivity (TSR or albedo) and the Solar Reflectance Index (SRI) of concrete are provided. The cementitious systems are infrared reflective and may be toppings mixed with water for application to existing concrete surfaces, or dry-shake hardeners for application to freshly-placed plastic concrete. The formulations of the invention utilize one or more of cementitious binder(s), graded aggregates, super-plasticizers, one or more pigments selected for improving infrared reflectivity and color composition, and/or optionally other additives, such as dry redispersible polymers or fillers to provide decorative and LEED compliant, highly durable (sustainable) concrete hardscapes and other decorative concrete.

24 Claims, 8 Drawing Sheets

U.S. PATENT DOCUMENTS

2010/0212552 A1* 8/2010 Stratton et al. ............... 106/712

FOREIGN PATENT DOCUMENTS

WO 2006058782 A1 6/2006

OTHER PUBLICATIONS

Solar Reflectance of Concretes for LEED Sustainable Sites Credit: Heat Island Effect, Marceau and VanGeem, Portland Cement Association, R & D Serial No. 2982, 2007, 95 pages.
SRIcalc10 SRI Calculator Tool, ASTM E 1980, coded by Ronnen Levinson, LBNL, 5 pages.
Tables for Terrestrial Direct Normal Solar Spectral Irradiance E891-87 (1992), 6 pages, http://www.astm.org/cgi-bin/SoftCart.exe/DATABASE.CART/WITHDRAWN/E891.htm, Apr. 18, 2008.
Twelve Principles of Green Chemistry, 1 page, http://www.epa.gov/oppt/greenchemistry/pubs/principles.html, Apr. 18, 2008.
XP002565518 (Ashwini K. Bendiganavale and Vinod C. Malshe), "Infrared Reflective Inorganic Pigments" Recent Patents on Chemical Engineering, vol. 1, No. 1, Jan. 1, 2008 (Jan. 10, 2008), pp. 67-79.
XP002565519 (J. Farny), "Pervious Concrete Mixtures and Properties" Concrete Technology Today, vol. 25, No. 3, Dec. 1, 2004, pp. 1-8.
PCT International Search Report and Written Opinion—PCT/US2009/030615—International Filing Date Sep. 1, 2009—Applicant L.M. Scofield.
Dr. Lutz Frischmann, Thermo Control—How to Turn Black into Cool, PCI Paint & Coatings Industry Website <http://www.pcimag.com/Articles/Feature_Article/BNP_GUID_9-5-2006_A_10000000000000243248>, Feb. 1, 2008.
Advanced Inorganic Chemistry, Cotton and Wilkinson, fourth edition, 1980, John Wiley & Sons, pp. 16-17, 687 and 753.
ASTM C 979-05 Standard Specification for Pigments for Integrally Colored Concrete, 5 pages.
ASTM E 891-87 (Reapproved 1992) Standard Tables for Terrestrial Direct Normal Solar Spectral Irradiance for Air Mass 1.5, a historical ASTM Standard, 6 pages.
ASTM E 892-87 (Reapproved 1992) Standard Tables for Terrestial Solar Spectral Irridiance at Air Mass 1.5 for a 37° Tilted Surface, a historical ASTM Standard, 2005, 8 pages.
ASTM E 903-96 Standard Test Method for Solar Absorptance, Reflectance and Transmittance of Materials Using Integrating Spheres, reapproved 2007, 13 pages.
ASTM G 173-03 Standard Tables for Reference Solar Spectral Irradiances: Direct Normal and Hemispherical on 37° Tilted Surface, 2003, 21 pages.
Effects of Composition and Exposure on the Solar Reflectance of Portland Cement Concrete, Levinson and Akbari, Dec. 2001, Lawrence-Berkeley National Laboratory, 49 pages.
Pigments for the colouring of building materials based on cement and/or time, CEN, European Committee for Standardization, 1998, 13 pages.
Policies to Reduce Heat Islands: Magnitudes of Benefits and Incentives to Achieve Them, Rosenfield, Romm, Akbari, Pomerantz and Taha, 1996, ACEEE Summer Study on Energy Efficiency in Buildings, 14 pages.
Preliminary Evaluation of the Lifecycle Costs and Market Barriers of Reflective Pavement, Ting, Koomey and Pomerantz, Nov. 2001, Lawrence-Berkeley National Laboratory, 64 pages.
R & T Update, Concrete Pavement Research & Technology ALBEDO a Measure of Pavement Surface Reflectance, American Concrete Pavement Association, Jun. 2002, 2 pages.
Examiner's Report issued on Nov. 15, 2011 in Australian Patent Application No. 2009241701, corresponding to International Patent Application No. PCT/US2009/030615.
Office Action issued on Mar. 30, 2009 in U.S. Appl. No. 12/114,452.
Office Action issued on Oct. 12, 2009 in U.S. Appl. No. 12/373,507, corresponding to International Patent Application No. PCT/US2009/030615.

* cited by examiner

HIGH SRI CEMENTITIOUS SYSTEMS FOR COLORED CONCRETE

CROSS-REFERENCE TO RELATED APPLICATIONS

This Application is a Continuation of U.S. application Ser. No. 12/114,452 now U.S. Pat. No. 7,815,728, filed on May 2, 2008; and is related to U.S. application Ser. No. 12/373,507, filed Apr. 28, 2010, which is a US national stage of International Application No. PCT/US09/30615, filed Jan. 9, 2009, which is a continuation-in-part of U.S. Pat. No. 7,815,728, the entire contents of both of which are incorporated herein by reference.

BACKGROUND

For millions of people living in and around cities, the urban heat island effect, i.e., a metropolitan area which is significantly warmer than nearby rural areas, is of growing concern. The elevated temperatures associated with the heat island effect, as well as increasing global temperatures, are impacting communities by increasing peak energy demand, air conditioning costs, air pollution levels, and heat-related illness and mortality. In addition, as energy costs are rising, there is a need to reduce energy consumption. The use of "cool" materials in roads and building construction can be used to mitigate the heat island effect, reduce energy demand and energy consumption. The term "cool" materials is used to describe building materials that have high solar reflectance, or albedo, and which reflect a large portion of the sun's energy. Cool materials may also have a high thermal emittance, releasing a large percentage of absorbed heat.

Keeping building materials cooler in sunlight is historically known. For example, U.S. Pat. No. 21,927 dated Oct. 26, 1858 (Johnson) discloses a new composition for roofing which uses mica as a solar reflector material. Johnson claims: "The mica being transparent and reflective, will act as a reflector of the sun's rays and add greatly to the coolness of the building to which it is applied." Other historical references also describe the use of building materials to ward off the sun's rays. See, e.g., U.S. Pat. Nos. 35,464; 2,133,988; 3,577, 379; 4,289,677; 4,424,292; and 4,624,710. Other references describing pigments used to protect building materials from sun exposure are also known. See, e.g., U.S. Pat. No. 5,006, 175. A color restoring (self-cleansing) concrete body based on photo-catalytic $TiO_2$ in anatase form is described in U.S. Pat. No. 3,102,039.

Complex Inorganic Color Pigments (CICPs) that are IR reflective are disclosed in several U.S. Pat. Nos. 6,174,360, 6,416,868 and 6,541,112. These pigments are generally of spinel, rutile or corundum-hematite basic structure and are manufactured by several companies. Examples of these types of pigment are the Ferro's "GEODE® and Eclipse™ Cool Colors™", The Shepherd Color Company's "Arctic® Colors", BASF's (formerly Engelhard) "Meteor® and Meteor® Plus" and Heubach's "Heucodur®" CICP products. Other references are known which also describe coatings and pigments for use in building materials. See, e.g., U.S. patent application Ser. Nos. 10/680,693 and 10/746,829, which disclose the use of 2-part coatings with infrared reflective pigments primarily for use in coating roofing granules for asphalt roofing, such as shingles; and U.S. patent application Ser. No. 10/989,120, which discloses a thermally insulating reflective coating system which is comprised of infrared reflective pigments, hollow micro-spheres, various fillers and resins where the coating has insulating as well as reflective properties.

Work during the mid to late 1970's and early 1980's in ASTM established a standard for pigments used to integrally color concrete. See, e.g., ASTM Research Report, *Pigments for Integrally Colored Concrete*, Journal of Cement, Concrete and Aggregates (1980); ASTM C 979 Standard, *Specification for Pigments for Integrally Colored Concrete*, (1982). More recently, a European Standard EN 12878, *Pigments for the colouring of building materials based on cement and/or lime*, has been adopted by the European common market standards organization (CEN).

Interest in concrete as a means of improving albedo or SRI of pavement has been studied by Ting, Koomey and Pomerantz as well as by Levinson and Akbari, both groups from the Lawrence Berkeley National Laboratory, and also by Marceau and VanGeem of the Portland Cement Association. These studies have considered gray and white cements as the primary factor in the resulting albedo or solar reflectance of the concrete with supplementary cementitious materials (SCM's), contributing to the overall reflectivity. Marceau and VanGeem found that about 80% of the variation of solar reflectance of concrete was due to the cement reflectance when no SCM was present and 75% when SCM's were included and cement reflection was constant. They report that fine aggregates have a very small effect on the solar reflectance and that coarse aggregates also have been determined to play a very minor role in the resulting concrete's albedo or solar reflectance.

Concrete is a highly versatile and durable structural material that is widely used in nearly all modern construction. There has been a growing trend to make concrete more aesthetically pleasing and, more recently, to provide sustainable site development with concrete construction. However, colored (non-white) concrete that is suitable as a building material, and also having a high solar reflectance is not known. Therefore, there is a need for concrete and other cementitious systems and cementitious mixtures with improved properties to be used in cool hardscapes and building construction.

SUMMARY

The concrete products of this invention allow significant improvement in infrared (IR) reflectivity of structures made from or covered in the cementious mixtures and cementitious systems of the invention, and also allow for making concrete coloring and texturing possible while providing a new color range of thin cementitious products. The cement systems of the invention reduce or mitigate the "heat island effect" as described in publications by the Heat Island Group, Lawrence Berkeley National Laboratory (LBNL), by their improved IR reflectivity. Further, the thin cementitious application products described herein allow ordinary gray concrete to be cost effectively improved to provide high reflectivity ("albedo") and high SRI along with a wide range of aesthetically pleasing colors.

The present invention provides a means of providing highly infrared reflective properties from dry-shake hardeners and toppings to provide a reduction in the well-documented "urban heat island effect". The resulting materials facilitate environmentally responsible construction practices under current "Green Building" and Leadership in Environmental Engineering and Design (LEED) guidelines as stated in the Ready Mixed Concrete Industry LEED Reference Guide to provide improved albedo and SRI performance well beyond what can be achieved with conventional concrete coloring systems currently available with the exception of white concrete. It has been widely recognized that by use of white portland cement concrete without pigments, fairly high albedo values can be achieved, however current colors, in particular darker colors, do not provide adequate albedo and could be referred to as hot colors. The present invention permits the designer, or owner of the concrete to cost effectively improve albedo and SRI values of the concrete while providing an extensive range of colors for concrete construction that can result in a more aesthetically pleasing and varied appearance as compared to conventionally colored architectural concrete.

According to one embodiment of the invention, a cementitious system comprising an infrared reflective pigment composition having one or more infrared reflective pigments and a cementitious matrix is provided. The infrared reflective pigments are selected from the group consisting of black infrared reflective pigments, red infrared reflective pigments; orange to yellow infrared reflective pigments; beige to brown infrared reflective pigments; green infrared reflective pigments; blue infrared reflective pigments; gray-white infrared reflective pigments; and combinations thereof.

According to the invention, the infrared reflective pigments comprise:

black infrared reflective pigments having a percent reflectance at 1000 nanometers of at least 40%, and preferably are selected from the group consisting of manganese-vanadium oxide spinels, chromium green-black hematites, aluminum- and titanium-doped chromium green-black modified hematites, chromium iron oxides, hematite chromium green-blacks, copper phthalocyanines including pigment green 7, iron chromite brown spinels including pigment brown 35, chromium iron nickel black spinels including pigment black 30, perylene blacks, and combinations thereof;

red infrared reflective pigments having a percent reflectance at 1000 nanometers of at least 60%, preferably selected from the group consisting of o-chloro-p-nitroaniline coupled β-napthols, m-nitro-p-toluidine coupled with β-napthols, diazotized p-aminobenzamide coupled with BON-o-phentidines, diketo-pyyrol-pyrrole reds, iron (III) oxide hematites, cerium sesquisulfides, quinacridone magenta B, pigment red 149, perylene reds, and combinations thereof;

orange to yellow infrared reflective pigments having a percent reflectance at 1000 nanometers of at least 65%, preferably selected from the group consisting of benzimidazolone blends, chromium antimony titanate buff rutiles, o-dianisidine coupled with aceto-acetanilides, dinitraniline coupled with beta-naphthols, insoindoline yellows, o-(2-methoxy-4-nitrophenylhydrazono)-α-aceto-2'-methoxyacetanilides, monoarylide yellows, nickel antimony titanates, nickel antimony titanium yellow rutiles, m-nitro-o-anisidine coupled with acetoacet-o-anisidines, potassium cerium sulfides, pyrazolo-quinazolones, quinophthalone yellows, and combinations thereof;

beige to brown infrared reflective pigments having a percent reflectance at 1000 nanometers of at least 60%, preferably chrome antimony titanium buff rutiles and chrome antimony titanium rutiles, such as pigment brown 24, chromium iron oxide, chromium iron oxide spinels, such as pigment brown 29, chrome niobium buff rutiles, such as pigment yellow 162, chrome tungsten titanium buff rutiles, as pigment yellow 163, iron chromite buff spinels, such as pigment brown 29, iron titanium brown spinels, such as pigment black 12, manganese antimony titanium buff rutiles, such as pigment yellow 164, manganese antimony titanium rutiles, manganese tungsten titanium rutiles, zinc ferrite brown spinels, such as pigment yellow 119, zinc iron chromite brown spinels, such as pigment brown 33, and combinations thereof;

green infrared reflective pigments having a percent reflectance at 1000 nanometers of at least 60%, preferably selected from the group consisting of chlorinated copper phthalocyanine greens, chromium green-black hematites, chromium green-black modified, chromium oxides, cobalt chromite blue-green spinels, cobalt chromite green spinels, cobalt titanate green spinels, partially halogenated copper phthalocyanines, and combinations thereof;

blue infrared reflective pigments having a percent reflectance at 1000 nanometers of at least 50%, preferably, selected from the group consisting of cobalt aluminate blue spinels, cobalt chromite blue-green spinels, cobalt chromium zinc aluminate spinels, cobalt lithium titanate green spinels, copper phthalocyanines, indanthrones, and combinations thereof;

gray to white infrared reflective pigments having a percent reflectance at 1000 nanometers of at least 60%, preferably, selected from the group consisting of black infrared reflective pigments, chromium green-black hematites, pigmentary anatase, chrome antimony titanium buff rutiles, and combinations thereof.

However, as will be understood by those of skill in the art by reference to this disclosure, the cementitious system according to the invention include a combination of infrared reflective pigments with the cementitious mixture to form an intermediate colored cementitious system.

According to another embodiment of the invention, the cementitious system is a dry shake color hardener, or a topping.

According to another embodiment of the invention, a composition for creating a colored cementitious material is provided. The composition comprises a cement and one or more infrared reflective pigments of the invention.

Methods for preparing a colored cement using one or more infrared reflective pigments of the invention are also provided. According to the method, the infrared reflective pigments may be added to the cement in the form of a topping for applying to hardened concrete, or added to the cement in the form of a dry-shake color hardener for applying to freshly placed concrete.

FIGURES

These and other features, aspects and advantages of the present invention will become better understood from the following description, appended claims, and accompanying figures where:

DESCRIPTION

Figure 1:
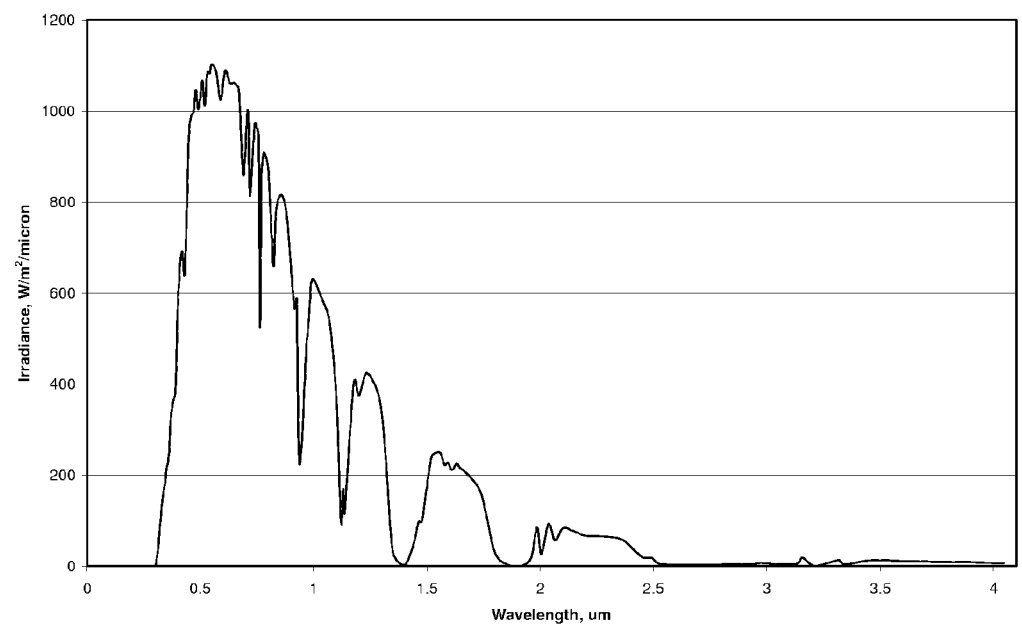
FIG. 1 is a graph showing direct normal irradiance, ASTM E 891, Air Mass 1.5.

According to one embodiment of the present invention, there is provided infrared (IR) reflective pigments for use in cementitious systems. The cementitious systems of the invention are concrete treatments that incorporate IR reflective pigments into formulations such as, toppings mixed with water for application to existing concrete surfaces, or dry-shake hardeners for application to freshly-placed plastic concrete. The cementitious systems of the invention may include, in addition to one or more IR reflective pigments, one or more of the following: cementitious binder(s); graded aggregates; super-plasticizers; pozzolans; one or more pigments selected for improving infrared reflectivity, or a desired color, and/or optionally other additives, such as dry redispersible polymers or fillers to provide decorative and LEED compliant concrete hardscapes and other decorative concrete.

The cementitious systems of the invention may be used to color concrete and to provide a wide range of cool architectural concrete colors, i.e., concrete having high solar reflectance index, or albedo, and which reflects a large portion of the sun's energy. The cementitious systems according to the invention may be cost effectively used to produce an IR-reflective surface for concrete that is not possible with ordinary gray portland cement concrete and with conventional pigments of similar colors. Colors included in the IR reflective compositions are: blacks, reds, yellows, oranges, greens, blues, browns, and whites. The IR reflective pigments of the invention may be combined to achieve colors such as beiges, purples, grays, or any intermediate shade thereof.

The color of the infrared reflective pigment described herein refers to the visual property of the pigment derived from the spectrum of light (distribution of light energy versus wavelength) in the corresponding category, e.g., red, orange, yellow, blue, green, etc. The color category and physical specification of a specified color is also associated with the compositions based on their physical properties such as light absorption, reflection, or emission spectra. Typically, the infrared reflective pigments described herein have a composition of light that is detectable by humans (wavelength spectrum from 400 nm to 700 nm, roughly).

In the case of black infrared pigments, the black color is the result of a pigment that absorbs light rather than reflects it back to the eye to "look black", and a black pigment may be a low intensity variation of a color, such as a blue-black or a green-black. A black pigment can, however, result from a combination of several pigments that collectively absorb all colors. If appropriate proportions of three primary pigments are mixed, the result reflects so little light as to be called "black".

In the case of gray-white infrared reflective pigments, the gray-white color refers to white pigments and the range of white to gray colors between black and white. Most gray-white pigments have a cool or warm cast to them.

The stated colors of the infrared pigments described herein should not be interpreted as absolute. Spectral colors form a continuous spectrum, and the infrared pigments described herein are divided into distinct colors as a matter of language, but it will be understood by those of skill in the art, that the colors of the infrared reflective pigments may be in-between a stated color, and still fall within the scope of the invention. Further, the intensity of a spectral color may alter its perception considerably, for example, a brown infrared reflective pigment is a low-intensity orange-yellow, and a beige infrared reflective pigment is a light yellowish brown color, but these colors, like the other colors described herein may have a range of color and intensity.

As used in this disclosure, the following terms have the following meanings.

"Absorptance" ($\alpha$) is the ratio of absorbed radiant flux to incident radiant flux.

"Albedo" is the ratio of reflected sunlight energy to the amount of solar irradiance (energy) falling on a given surface. As used herein, the term refers to the overall spectra reflectance of sunlight from ~360 nm to 2500 nm based on calculation from spectral values obtained by ASTM E 903 and solar insolation values from ASTM E 891 using the 50-point selected (equal-energy) ordinate method for direct solar irradiance. ASTM E 891 data is at air mass 1.5, turbidity 0.27 and zenith angle of at 48.19° which is a composite value for the contiguous United States. Albedo can be expressed as a percent, or more commonly, as a decimal fraction, such as 0.29. Total Solar Reflectance (TSR) and albedo are used interchangeably. It should be noted that albedo (TSR) includes portions of the UV, all of the visible spectra and from 701 nm to 2500 nm in the near infrared. Generally dark colored materials have low albedo and light colored materials have high albedo, however IR reflective materials can be fairly dark and still have fairly high albedo values.

"CICP" is a "Complex Inorganic Colored Pigment", which is a colored mixed metal oxide.

"Infrared (IR) Reflectance" as used herein refers to the hemispherical reflectance values measured from ASTM E 903 for wavelengths from 700 to 2500 nm referenced to standards using a diffuse reflectance measurement with a hemispherical integrating sphere.

"LEED" is an acronym for Leadership in Environmental Engineering and Design, a program administered by the U.S. Green Building Council (USGBC), to promote sustainability, energy efficiency and to minimize environmental impact in both new construction (NC) and existing buildings (EB). The LEED requirements referenced herein are related to mitigation of the "Urban Heat Island Effect" under LEED Sustainable Sites Credit 7.1 and possible exemplary credit for high levels of performance, well beyond what is required.

"Kirchoff Relationship" per ASTM E 903 defines 3 parameters as follows: $\alpha_s+\tau_s+\rho_s=1$, where $\alpha_s$ is the absorptance, $\tau_s$ is transmittance and $\rho_s$ is reflectance. Transmittance, $\tau_s=0$ for opaque materials (e.g. concrete). High absorptance is related to the heat build-up and the high reflectance is required to reduce heat build-up.

"Reflectance, $\rho$", is the ratio of the reflected radiant flux to the incident radiant flux.

"Solar Insolation" refers to the solar irradiance that is incident on a surface, considering angle, air mass, global position and other atmospheric conditions.

"Solar Irradiance per unit wavelength" refers to the energy that is available from sunlight under specified conditions, such as air mass=1.5 and 37° tilt or direct, or other variables such as global position and atmospheric chemical composition, turbidity or rural aerosol and unit of wavelength. This information is derived from measured solar irradiance data from SMARTS2 or earlier solar models, such as Fröhlich and Wherli or Neckel and Labs.

"Solar Irradiance, Spectral" refers to the solar irradiance ($E_\lambda$) that is available at a given wavelength, $\lambda$, using the units, watts*square metre$^{-2}$*$\mu m^{-1}$, where $E_\lambda=dE/d\lambda$.

Solar Reflectance Index (SRI) enables estimation of how hot a surface will become upon exposure to sunlight. It is computed from the TSR or albedo values using the Stefan-Boltzman Constant, 5.67 E-8 watts*m$^{-2}$*°$K^{-4}$ and can include a normally assigned emittance ($\epsilon$) value (e.g. $\epsilon$=0.90 for concrete), wind speed, air and sky temperatures as well as reflectances and temperatures of both black and white surfaces.

"Urban Heat Island Effect" is the known increase in the average temperature of cities or urban areas as compared to the temperatures of surrounding non-urban areas. This temperature rise is due to the pavement and buildings with low solar reflectivity as opposed to the trees and vegetation with higher solar reflectivity in the non-urban areas.

As used in this disclosure, the term "comprise" and variations of the term, such as "comprising" and "comprises," are not intended to exclude other additives, components, integers or steps.

All amounts disclosed herein are given in weight percent of the total weight of the composition.

In one embodiment, the present invention is the use of one or more infrared (IR) reflective pigments in a cementitious system. The IR reflective pigments of the invention are blacks, reds, yellows, oranges, greens, blues, browns, and whites, and may be combined to achieve colors such as beiges, purples, grays, and other intermediate shades. The IR reflective pigments are formulated in a cementitious system, such as a topping or a dry-shake color hardener for concrete. The dry-shake color hardener and topping formulations of the invention use pigments that have good IR reflective properties. The IR reflective pigments of the invention may be obtained from a commercial source and are selected based on the criteria described below. The cementitious systems according to the invention are designed to maximize the effectiveness of the selected pigments in a system and result in a group of colored products that provide significant-improvements in the albedo of the concrete substrate as compared to conventional technology. The cementitious systems according to the invention significantly reduce surface temperature rise with sunlight exposure as compared to analogous conventional products. Cementitious systems including toxic or environmentally harmful pigments such as any containing lead, arsenic, cadmium, hexavalent chromium and aniline-based colors were deemed unsuitable and were eliminated from consideration since these materials are not in accordance with the principles of Green Chemistry. All other non-toxic or environmentally-safe systems described in the above compositions are formulated to observe the Twelve Principles of Green Chemistry, (http://www.epa.gov/greenchemistry/pubs/principles.html), wherever applicable.

Most of the IR reflective pigments are pigment types from the category of complex inorganic color pigments (CICPs). CICPs are generally of the rutile, spinel or corundum-hematite crystal structure, as described in Advanced Inorganic Chemistry, Cotton and Wilkinson, 1980, pp. 16-17. These CICPs, formerly referred to as mixed metal oxides (MMOs), have 2 or more metals in the same crystal unit structure. These crystal structures are generally referred to as rutile, spinel or corundum-hematite, based on the composition and crystal lattice structures of the minerals rutile, spinel or corundum-hematite. Corundum structures in $\alpha$-$Al_2O_3$ form may also be referred to as hematites.

Rutiles, as described in Advanced Inorganic Chemistry, Cotton and Wilkinson, 1980, p. 16 are composite metal oxides with a crystal structure corresponding to the rutile form of titanium dioxide $TiO_2$, where each metal ion is in a 6-coordinate system with the oxygen ions. These are generally represented by the formula $MO_2$, where M represents one or more metal ions. Nickel antimony titanate is an example of a rutile structure, with part of the Ti (IV) cations replaced by nickel (II) cations and antimony (V) cations, all occupying the same rutile lattice unit cell structure.

Spinels, as described in Advanced Inorganic Chemistry, Cotton and Wilkinson, 1980, p 17, are composite metal oxide crystal structures generally referring to the formula $MgAl_2O_4$. Spinels have a symmetry of ccp (cubic close-packed) of the oxygen ions with one-eighth of the tetrahedral holes filled with $Mg^{+2}$ ions and one-half of the octahedral holes occupied by $Al^{+3}$ ions. Many CICPs have this same structure for $M_a^{+2}M_{b2}^{+3}O_4$ metal oxides, where $M_a$ is a metal ion of valence +2 with one ion per spinel unit structure and $M_{b2}$ is a metal of valence +3 with 2 ions per spinel unit structure. Structurally, this is equivalent to $M_a[II]O.M_b[III]_2O_3$ metal oxides, for normal spinels, but $M_a[IV]O.M_b[II]_2O_3$ or $M_a[I]_2O.M_b[VI]O_3$ and other variations can also form.

Corundums, as described in Advanced Inorganic Chemistry, Cotton and Wilkinson, 1980, p 16, are metal oxides crystal structures referring to corundum, $\alpha$-$Al_2O_3$ and hematite $Fe_2O_3$ which have a symmetry of hcp (hexagonal close-packed) oxygen ions with two-thirds of the octahedral interstices occupied by metal cations. Examples of these compounds are $Cr_2O_3$ or $FeCrO_3$ where the metal cation(s) is/are normally in the +3 valence state.

There are many variations of these unit cell structures as described in Advanced Inorganic Chemistry, Cotton and Wilkinson, 1980, p 17, p 753, such as inverse spinels with $Fe_3O_4$ (magnetite) as an example of a stoichiometric compound where the $Fe^{+2}$ and $Fe^{+3}$ ions occupy the spaces normally occupied by the oxygen ions in the crystal lattice. Disordered spinels which are not stoichiometric, have only a fraction of the tetrahedral sites or the octahedral sites occupied by metal ions. The size relationships of the metal cations to the size of the oxygen anions (ionic radii) and Vegard's Law generally determine the resulting crystal lattice structure.

CICP pigments are considerably more costly to produce than conventional iron oxide and chromium oxide based pigments, however, they are very stable chemically and are resistant to high heat and UV exposure as well because they are produced at up to 1000° C. (1800° F.). CICP pigments provide color by electron transitions from one quantum energy level (mostly in d-orbitals) to another (also mostly d-orbital) where part of the white sunlight is absorbed and the remaining complementary color in the visible range (and extending into the NIR) is reflected.

Many organic pigments have fair to good IR reflectivity and are generally more intensely colored than the similar colors are with inorganic pigments. Some of these organic colors extend the available color range to include colors that cannot be achieved with conventional inorganic pigments. Organic pigments provide color by having chromophore groups with conjugated π-electrons that provide resonant structures absorbing energy at certain wavelengths in the visible range and IR spectral range and reflecting energy at other wavelengths. Organic pigments, in many cases, are sensitive to the harsh high (11-12) pH environment of cementitious materials and even though they work fine in coatings, they may fail rapidly in moist exterior exposed cementitious systems. In some cases the organic pigments also can fail due to UV exposure as noted with BASF (formerly Engelhard) 1270 Diarylide Yellow above. Additionally, some organic pigments do not disperse well enough in cementitious systems or can cause excessive reductions in physical properties of the cementitious systems such as reduction of compressive strength. Other organic pigments will not remain bound in the cementitious matrix and can wash out over time. Given all of these potential incompatibilities, adequate testing is required to thoroughly evaluate each pigment used in the IR reflective cementitious systems according to the invention.

As described below, pigments used according to the invention may be obtained from commercial sources, where indicated, or are available from a variety of manufactures where indicated. The following abbreviations are used for the following commercial suppliers. BASF having offices in Charlotte, N.C., is referred to as BASF, BASF formerly Engelhard, having offices in Iselin, N.J. is referred to as "BASF-E"; Colorchem International Corp., having offices in Atlanta, Ga. is referred to as "Colorchem" CIBA Specialty Chemicals, having offices in Newport, Del. is referred to as "CIBA"; Ferro Corporation, having offices in Cleveland, Ohio is referred to as "Ferro"; Elementis Pigments, having offices in East St. Louis, Ill. is referred to as "Elementis"; Heubach, having offices in Fairless Hills, Pa., is referred to as "Heubach"; The Shepherd Color Co., having offices in Cincinnati, Ohio is referred to as "Shepherd"; Sun Chemical, having offices in Cincinnati, Ohio is referred to as "Sun"; and United Color Manufacturing, having offices in Newtown, Pa. is referred to as "United".

According to one embodiment of the invention, cementitious systems for black colored dry-shake hardeners and toppings are provided. These cementitious systems have black IR reflective pigments. Preferably, the black IR reflective pigments have a minimum value of 40% reflectance at 1000 nm.

The black IR reflective pigments that provide the desired IR-reflective properties may include one or more of the following pigments:

aluminum and titanium doped chromium green-black modified hematites, commercially available as V-780 Cool Colors™ IR Brown Black (Ferro) and V-799 Cool Colors™ Brown Black (Ferro);

chromium green-black hematites, commercially available as pigment green 17, GEODE® V-775 Cool Colors IR Black (Ferro), GEODE® V-778 IR Black (Ferro), GEODE® 10204 IR Eclipse™ Black (Ferro), O-1775B Ebony (Ferro), Black 10C909 (Shepherd), and Black 30C940 (Shepherd);

chromium iron nickel black spinels, commercially available as pigment black 30, Heucodur® Black 950 (Heubach);

chromium iron oxides, commercially available as pigment brown 29, such as Black 411 (Shepherd), 9880 Meteor® Plus High IR Jet Black (BASF-E), 9882 Meteor® Plus Black (BASF-E), 9887 Meteor® Plus Black (BASF-E), hematite chromium green-blacks, commercially available as pigment green 17, such as Heucodur® Black 910 (Heubach);

iron chromite brown spinels, commercially available as pigment brown 35, such as Heucodur® Black 920 (Heubach), Heucodur® Black 940 (Heubach);

manganese vanadium oxide spinels, commercially available as GEODE® 10201 Eclipse™ Black (Ferro), GEODE® 10202 Eclipse™ Black (Ferro), and GEODE® 10203 Eclipse™ Blue Black (Ferro); and perylene black, commercially available as Paliotol™ L 0086 (BASF).

In a preferred embodiment, a black IR reflective cementitious system is provided. More preferably, the black IR reflective cementitious system is a topping or dry-shake color hardener that utilizes the CICP black pigments, GEODE® V-775 (Ferro) and Eclipse™ Black 10202 (Ferro), to achieve the black to gray range of colors with high albedo or SRI. The most preferred black color cementitious system is a topping or dry-shake color hardener system that utilizes Eclipse™ Black 10202 (Ferro) to achieve the highest possible albedo or SRI values.

Figure 2A:
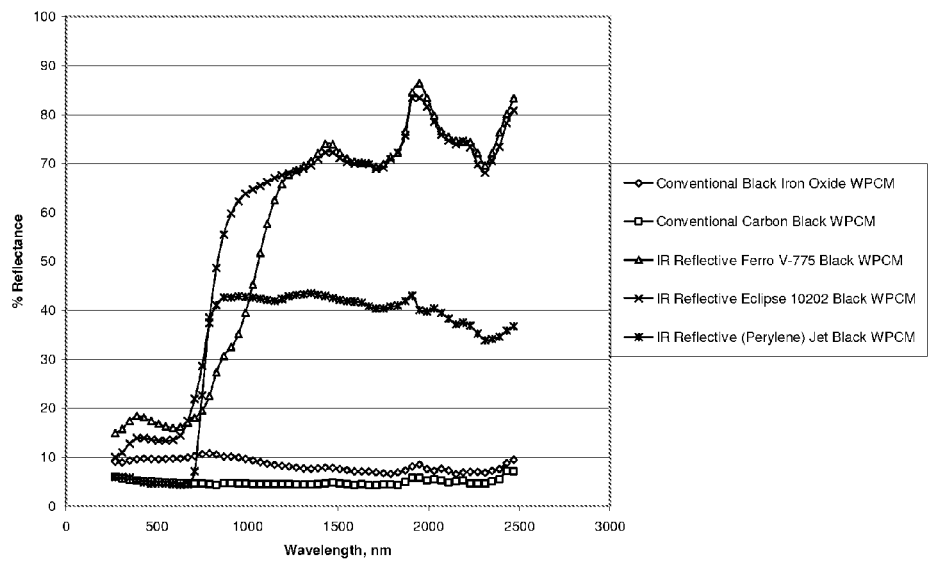
FIG. 2A is a graph of spectral reflectance for conventional black pigmented systems and infrared reflective black pigmented systems according to one embodiment of the invention.

As it is known to those in the art, carbon black and black iron oxide absorb strongly across the whole UV, Vis and NIR spectrum, have very poor albedo or SRI values, and are generally unsuitable for any application where IR reflectivity is required. Referring now to FIG. 2A, the data covering formulas with these carbon black and black iron oxide pigments are shown to indicate the difference in current knowledge of the art in architectural colored concrete and the cementitious systems, including dry-shake hardener and toppings having black IR reflective pigments of the invention.

As noted, black iron oxide and carbon black are not suitable in systems intended to provide IR reflectivity. In addition, it has also been determined that many CICP pigments in the black range are similarly unsuitable for use in cementitious topping or dry-shake systems intended to provide IR reflectivity. Examples of such low IR reflective systems are with CICP pigments that include manganese ferrite black spinel (F-6331-2 (Ferro), Coal Black) and iron cobalt chromite black spinel (pigment black 27, GEODE® 10335 Black (Ferro)), where the latter-named pigment shows the characteristic cobalt trough from 1200-1800 nm. Another system with only weak to moderate IR reflectivity uses chrome iron nickel black spinel (GEODE® 10456 Black (Ferro)). It has also been determined that although topping systems can be pigmented with carbazole violet, pigment violet 23 (Sun) mixed with phthalocyanine green, (pigment green 7) to provide an intense black with excellent IR reflectivity, this combination of pigments does not remain adequately bound into the topping material and would be expected to wash out over time. The carbazole violet, phthalocyanine green combination was not tested in a dry-shake hardener system due to its failure to remain bound in the topping binder system and also to the possibility of wind-blown organic pigment from dry-shake broadcast application procedures.

According to another embodiment of the invention, cementitious systems for red colored dry-shake hardeners and toppings are provided. These cementitious systems have red IR reflective pigments. Preferably, the red IR reflective pigments have a minimum value of 50% reflectance at 1000 nm.

The red IR reflective pigments that provide the desired IR-reflective properties may include one or more of the following pigments:

- o-Chloro-p-nitroaniline coupled β-napthols, such as 1088 Blazing Red (BASF-E);
- m-nitro-p-toluidine coupled with β-napthols, such as 1173 Toluidine Dark Red (BASF-E);
- diazotized p-aminobenzamide coupled with BON-o-phentidines, such as 3169 Red (BASF-E) and 3170 Red (BASF-E);
- diketo-pyyrol-pyrrole (DPP) reds, such as CIBA Irgazin® Red 2030 (CIBA);
- iron (III) oxide hematites, such as GEODE® V-13810 High IR Red (Ferro), however, red iron oxide pigments other than V-13810 may have small amounts of magnetic iron oxide which can adversely affect their reflective properties across the UV-Vis-NIR spectrum;
- cerium sesquisulfides, such as Rhodia Neolor™ Red S (Colorchem);
- quinacridone magenta B, such as Sunfast® Red 228-1220 (Sun), 228-6725 (Sun); and
- perylene reds, such as United pigment red 149, (United);

In a preferred embodiment, a red IR reflective cementitious system is provided. More preferably, the IR reflective cementitious system is a topping or dry-shake color hardener that utilizes red IR reflective pigments including iron (III) oxide hematites, such as GEODE® V-13810 High IR Red (Ferro), and cerium sesquisulfides, such as Rhodia Neolor™ Red S to achieve the high albedo and SRI values. The most preferred red IR reflective pigment is Rhodia Neolar™ Red S, used in topping and dry-shake color hardeners to provide the best possible albedo and SRI values.

In the selection of pigments in the IR reflective red range it was determined that Casacolor DPP Red 2540, pigment red 254, (Keystone Aniline, Chicago) would not stay in the topping system binder well enough and would be prone to wash out in exterior applications. The performance of the Ciba Irgazin® DPP Red 2030 was satisfactory and it did not have the same wash out tendency, which was likely due to different crystalline structure vs. the Casacolor DPP Red 2540. The conventional iron oxide pigment controls, such as Bayferrox® Red 140, can provide moderate albedo and SRI values when used in white portland cement systems, however, a significant gain in albedo and SRI can be achieved by using a system with higher IR reflectivity, for example using GEODE® V-13810 High IR Red (Ferro), Ciba Irgazine® DPP Red (CIBA) or Rhodia Neolor™ Red S (Colorchem) in the topping or dry-shake formulations. A topping specimen with an orange blend of Casacolor DPP Red 2540 (Keystone) and conventional yellow 2087 pigment also showed loss of red fading to yellow after 10 months of exterior exposure and was excluded however the topping with DPP red (CIBA) had satisfactory performance after 1 year of exterior exposure.

According to another embodiment of the invention, cementitious systems for yellow and orange colored dry-shake hardeners and toppings are provided. These cementitious systems have yellow and orange IR reflective pigments. Preferably, the yellow and orange IR reflective pigments have a minimum value of 65% reflectance at 1000 nm.

The yellow and orange IR reflective pigments that provide the desired IR-reflective properties may include one or more of the following pigments:

- benzimidazolone blends, such as 1207 Rightfit™ Yellow 3G (BASF-E);
- chromium antimony titanate buff rutiles, such as Heucodur® Yellow 3R (Heubach), Heucodur® Yellow 256 (Heubach), GEODE® 10411 Bright Golden Yellow (Ferro); and Arctic® Yellow 10C272 (Shepherd);
- o-dianisidine coupled with aceto-acetanilides, such as 2915 Orange (BASF-E);
- dinitraniline coupled with beta-naphthols, such as 2916 Orange (BASF-E);
- insoindoline yellows, such as Paliotol™ Yellow L1820 (BASF-E),
- o-(2-methoxy-4-nitrophenylhydrazono)-α-aceto-2'-methoxyacetanilides, such as 1244 Sunglow Yellow "Hansa yellow" (BASF-E);
- monoarylide yellows, such as Sunfast® 272-6123 (Sun);
- nickel antimony titanates, rutile symmetry structures, such as pigment yellow 53, 9350 Meteor® Yellow (BASF-E), Heucodur® HD 152 (Heubach), GEODE® V-9416 Eclipse™ Yellow (Ferro) Arctic 10C112 (Shepherd), 10G152 Yellows (Shepherd);
- nickel antimony titanium yellow rutiles, such as Heucodur® Plus Yellow 150 (Heubach) and Yellow 152 (Heubach), Yellow 156 (Heubach),
- m-nitro-o-anisidine coupled with acetoacet-o-anisidines, such as 1237 Sunglow Yellow (BASF-E), Sunglow 1244 (BASF-E), and Sunglow 1241 SY (BASF-E);
- potassium cerium sulfides, such as Rhodia Neolor™ Orange S (Colorchem);
- pyrazolo-quinazolones, such as Paliotol™ 2930 HD Orange (BASF); and
- quinophthalone yellows, such as Paliotol™ Yellow L 0962 HD (BASF);

In a preferred embodiment, a yellow IR reflective cementitious system is provided. More preferably, the yellow cementitious system is a topping or dry-shake color hardener that utilizes a yellow IR reflective pigment including, Ferro V-9416 Yellow, Ferro 10411 Bright Golden Yellow or for toppings only BASF Paliotol™ L 0962 HD Yellow. The most preferred yellow IR reflective pigment is Ferro GEODE® V-9416 Yellow, used in a topping or dry-shake color hardener, to achieve the highest possible albedo and SRI values.

Problems were encountered when evaluating Ciba Yellow 2GTA, a bismuth vanadate pigment. This pigment failed to disperse properly and showed an undue effect on workability of the topping systems and relatively poor tint strength. The compressive strength and other mechanical properties of the topping system were compromised by the use of this pigment. Another yellow pigment 1270 Diarylide Yellow BASF-E and equivalent diarylide yellows from Sun were excluded because a topping specimen with this pigment bleached after 6 months of exterior exposure to sunlight although the masked area did not bleach, indicating UV failure of the pigment in sun exposed area.

According to another embodiment of the invention, cementitious systems for beige and brown colored dry-shake hardeners and toppings are provided. These cementitious systems have beige and brown IR reflective pigments. Preferably, the beige and brown IR reflective pigments have a minimum value of 60% reflectance at 1000 nm.

The beige and brown IR reflective pigments that provide the desired IR-reflective properties may include one or more of the following pigments:

- chrome antimony titanium buff rutiles and chrome antimony titanium rutiles, commercially available as pigment brown 24, GEODE® V-9156 Autumn Gold (Ferro) and Heucodur® Yellow 3R (Heubach);
- chromium iron oxide, commercially available as Black 411 (Shepherd);
- chromium iron oxide spinels, commercially available as pigment brown 29, Heucodur® Brown 869 (Heubach);
- chrome niobium buff rutiles, commercially available as pigment yellow 162, GEODE® V-12107 Sand Yellow (Ferro);
- chrome tungsten titanium buff rutiles, commercially available as pigment yellow 163, GEODE® V-12110 Deep Burnt Orange (Ferro);
- iron chromite buff spinels, commercially available as pigment brown 29, 9760 Meteor® Plus HS Brown (BASF-E) and 9770 Meteor® Plus HS red Brown (BASF-E);
- iron titanium brown spinels, commercially available as pigment black 12, GEODE® 10358 Yellow Brown (Ferro) and Brown 200819 (Shepherd);
- manganese antimony titanium buff rutiles, commercially available as pigment yellow 164, GEODE® 10550 Brown (Ferro), GEODE® 10364 Brown (Ferro), GEODE® V-12100 Mahogany Brown (Ferro), Brown 10C873 (Shepherd), and Brown 352 (Shepherd),
- manganese antimony titanium rutiles, commercially available as 9749 Meteor® Plus Brown (BASF-E) and 9750 Meteor® Plus Brown (BASF-E);
- manganese tungsten titanium rutiles, commercially available as 9730 Meteor® Plus High IR Brown (BASF-E);
- zinc ferrite brown spinels, commercially available as pigment yellow 119, GEODE® V-9115 Buff (Ferro) and GEODE® 10520 Deep Tan(Ferro); and
- zinc iron chromite brown spinels, commercially available as pigment brown 33, GEODE® 10363 Dark Brown (Ferro);

In addition, beige and brown IR reflective pigments may include all of the red orange and yellow color ranges listed above, as well as pigmentary anatase when lighter colored self-cleaning colors are required for a particular application, and to provide the desired IR-reflective properties.

In a preferred embodiment, brown and beige IR reflective cementitious systems are provided. More preferably, the brown and beige cementitious systems are toppings or dry-shake color hardeners that utilize manganese antimony titanium buff rutiles, more specifically, GEODE® 10550 Brown (Ferro), and optionally a chrome antimony buff rutile, more specifically, GEODE® 10411 Bright Golden Yellow (Ferro) and anatase to achieve a range of brown to beige colors with high albedo and SRI values.

According to another embodiment of the invention, cementitious systems for green colored dry-shake hardeners and toppings are provided. These cementitious systems have green IR reflective pigments. Preferably, the green IR reflective pigments have a minimum value of 60% reflectance at 1000 nm.

The green IR reflective pigments that provide the desired IR-reflective properties may include one or more of the following pigments:

- chlorinated copper phthalocyanine greens, such as pigment green 7, many commercially available sources are known to those in the art;
- chromium green-black hematites, commercially available as pigment green 17, such as 10241 Eclipse™ IR Green (Ferro);
- chromium green-black modified pigments, such as V-12650 Hi IR Green (Ferro);
- chromium oxides, commercially available as pigment green 17, such as G-4099 Chromium oxide green (Elementis), Green 17 (Elementis), and 3955 Chromium Green Oxide, (BASF-E).
- cobalt chromite blue-green spinels, commercially available as pigment blue 36, Green 187 B (Shepherd) and Green 201 (Shepherd);
- cobalt chromite green spinels, commercially available as pigment green 26, such as GEODE® V-12600 Camouflage Green (Ferro), V-12604 Camouflage Green (Ferro), and Green 410 (Shepherd);
- cobalt titanate green spinels, commercially available as pigment green 50, such as GEODE® V-11633 Kelly Green (Ferro), Green 10G663 (Shepherd), Green 223 (Shepherd), Green 260 (Shepherd), Heucodur® Green 5G, (Heubach), and 9444 Meteor® Plus Green, (BASF-E) and
- partially brominated (or halogenated) copper phthalocyanines, such as pigment green 36, such as Green 36 (BASF).

In a preferred embodiment, green IR reflective cementitious systems are provided. More preferably, the green IR reflective cementitious systems are a topping or dry-shake color hardener that utilizes a chromium green-black hematite, such as Eclipse™ 10241 Green (Ferro) and optionally a cobalt titanate green spinel, such as V-11633 Kelly Green (Ferro), cobalt chromite green spinels, such as V-12600 Camo Green (Ferro) and V-12604 Camo Green (Ferro), and chromium green-black modified, such as V-12650 Cool Colors™ Green (Ferro) to achieve a range of green colors with high albedo and SRI values. The most preferred green IR reflective cementitious systems use light green colors from cobalt chromite green spinels, such as Ferro V-12600 Camo Green to achieve the highest possible albedo and SRI values.

According to another embodiment of the invention, cementitious systems for blue colored dry-shake hardeners and toppings are provided. These cementitious systems have blue IR reflective pigments. Preferably, the blue IR reflective pigments have a minimum value of 50% reflectance at 1000 nm.

The blue IR reflective pigments that provide the desired IR-reflective properties may include one or more of the following pigments:

- cobalt aluminate blue spinels, commercially available as pigment blue 28, such as GEODE® V-9236 Blue (Ferro), GEODE® V 9250 Bright Blue (Ferro), GEODE® 10446 Bright Blue (Ferro), Blue 30C591 (Shepherd), Blue 214 (Shepherd), Blue 385 (Shepherd), Blue 424 (Shepherd), Blue 10K525 (Shepherd), Blue 10G594 (Shepherd), 7540 Meteor®Cobalt Blue (BASF-E), and 9546 Meteor® Plus Cobalt Blue (BASF-E), Heucodur® Blue 550 (Heubach), and Blue 2R (Heubach);
- cobalt chromite blue-green spinels, commercially available as pigment blue 36, such as GEODE® V-9248 Ocean Blue (Ferro), GEODE® F-5686 Turquoise (Ferro), Blue 30C527 (Shepherd), Blue 211 (Shepherd), Blue 212 (Shepherd), 9538 Meteor® Plus Blue G, (BASF-E) Heucodur® Blue 5-100 (Heubach), Blue 4G (Heubach), and Blue 559 (Heubach);

cobalt chromium zinc aluminate spinels, commercially available as pigment blue 36:1, such as 7590 Meteor® Cerulean Blue (BASF-E), cobalt lithium titanate green spinels, commercially available as pigment green 50, such as 9530 Meteor® Plus Teal Blue (BASF-E), copper phthalocyanine, commercially available as pigment blue 15:3 and pigment blue 15:2, several manufacturers, such as Heubach; and indanthrones, commercially available as pigment blue 60, such as Paliotol™ Blue L6495 F (BASF), Indanthrone Blue (BASF).

In a preferred embodiment, blue IR reflective cementitious systems are provided. More preferably, the blue IR reflective cementitious systems are a topping or dry-shake color hardener that utilize blue-aqua IR Reflective pigments, including, cobalt chromite blue-green spinels, such as V-9248 Ocean Blue (Ferro), F5686 Turquoise (Ferro) and optionally cobalt aluminum spinels, such as V-9250 Bright Blue (Ferro), Ferro V-9236 Blue (Ferro), and 10446 Bright Blue (Ferro) to achieve a range of blue to aqua colors with high albedo and SRI values. The most preferred blue-aqua IR reflective pigments are cobalt chromite blue-green spinels in blue-green colors, such as V-9248 Ocean Blue or F-5686 Turquoise to achieve the highest possible albedo and SRI values.

According to another embodiment of the invention, cementitious systems for gray, light gray, pastel and white colored dry-shake hardeners and toppings are provided. These cementitious systems use gray, light gray, pastel and white IR reflective pigments. Preferably, the gray, light gray, pastel and white IR reflective pigments have a minimum value of 60% reflectance at 1000 nm.

The gray, light gray, pastel and white IR reflective pigments that provide the desired IR-reflective properties may include one or more of any of the above referenced pigments but in generally lower dosage rates and in combination with untreated pigment grade anatase $TiO_2$ to provide self-cleansing action upon exposure to UV radiation (from sunlight) and moisture. This self-cleansing property is important in maintaining the high reflectivity and albedo of the surface. Variations of this would include the use of photocatalytic $TiO_2$ materials such Ishihara ST-01 ISK Ishihara, San Francisco, Calif. and Aeroxide® $TiO_2$ P 25, Evonik Degussa Corporation, Alpharetta, Ga. or other microfine $TiO_2$ anatase grades.

The loss of reflectivity of white portland cement concrete over time has been reported, for example in, American Concrete Pavement Association, June 2005, where white portland cement concrete has an albedo of 0.7-0.80 when new but dropped to 0.40-0.60 when aged. Additional functional fillers include white metakaolin, such as Burgess Optipozz® (Burgess Pigments, Sandersville, Ga.), BASF Metamax® (BASF-E), Metastar® 450 (Imerys Corporation, Atlanta, Ga.) and various white diatomaceous earth products such as Diafil® 2000 or Celite® for Concrete, C4C, (World Minerals, Lompoc, Calif.). The incorporation of barium sulfate increases the albedo of the surface material while enabling use of darker IR reflective pigments since it has low tint strength. Elotex® ERA 100 (National Starch Corp., Bridgewater, N.J.), an efflorescence reducing admixture, was also found to reduce the effects of white discoloration of dark colored IR reflective systems. Other fillers such as nepheline syenite (Minex, a Unimin product), aluminum trihydroxide (Almatis), white quartz (Unimin, New Canaan, Conn.), calcium carbonate (Omya or Imerys) and white ceramic microspheres (Zeeospheres®, white grades, 3M Corp, Minneapolis, Minn.), Vitrified Calcium Aluminosilicate, VCAS®, (Vitro Minerals, Atlanta, Ga.) and White Silica Fume (Elkem Materials, Pittsburgh, Pa. or Technical Silica, Atlanta, Ga.) can be used to improve the overall reflectivity of cementitious materials.

In a preferred embodiment, gray, light gray, dark gray and bright white IR reflective cementitious systems are provided. More preferably, the gray, light gray, dark gray and bright white IR reflective cementitious systems are a topping or dry-shake color hardener that utilize IR reflective pigments in the concrete gray and white range. Such systems may include pigments and pigment blends such as:

infrared reflective black pigments, such as 10202 Eclipse™ Black (Ferro);

chromium green-black hematites, commercially available as pigment green 17, such as V-775 Cool Colors™ IR Brown Black (Ferro);

pigmentary anatase white; and chrome antimony titanium buff rutiles, commercially available as pigment brown 24, such as 10411 Golden Yellow (Ferro).

Light colors, such as light gray may be made with anatase and one or more IR reflective black pigments or pastel colors with anatase and other IR reflective pigments in white portland cement. These cementitious systems offer the highest TSR (albedo) and SRI values that can be achieved with the technology described herein. The anatase is also known to provide a self-cleansing effect, upon exposure to UV light and moisture, that will help to maintain the high TSR (albedo) and SRI of the surface when exposed to soiling from soot, dirt, plant matter and other staining materials.

White portland cement is preferred for formulating the high-albedo IR reflective cementitious systems according to the invention, including toppings and dry-shake hardeners. Secar™ 71 (Kerneos™, Chesapeake, Va.) or Almatis CA25 (Almatis Alumina, Leetsdale, Pa.), white calcium aluminate cements, can be used as well in some formulations. In particular, a white portland cement made by Aalborg Portland Cement in Denmark, distributed by Lehigh Cement Company, Allentown, Pa. via Florida terminals is the preferred choice. As far as cement chemistry, particle size distribution and cement uniformity in this cement is unequalled. It is a Type I, II and V portland cement per ASTM C 150 and has very low alkalies, in the range of 0.25% $Na_2O$ equivalent. However, other white portland cements can be used in these high-albedo formulations as will be understood by those of skill in the art by reference to this disclosure. Ground Granulated Blast Furnace Slag Cement (GGBFS), or simply slag cement, is also light in color and can be blended and used in high-albedo toppings and dry-shake hardeners, however, early strengths may be reduced significantly but ultimate strengths will generally be higher. Alkali activated slag cement can also be used to overcome the early strength issues.

The cementitious systems according to the invention may be in the form of a topping for applying to hardened concrete. The topping is formulated from cementitious materials including cements, pozzolans, redispersible polymers, silica fine aggregates, fillers, admixtures and separately packaged color components. These topping products, comprised of a base and a color pack are mixed with water and are typically spread or sprayed onto existing concrete and then troweled, broomed or imprinted to the desired surface texture.

The cementitious systems according to the invention may also be in the form of a dry-shake color hardener. The dry-shake color hardener is formulated similar in composition to the topping described above, but with integral colors and plasticizers, and without redispersible polymers. These dry-shake color hardener products are applied only to freshly placed concrete by broadcasting evenly over the wet concrete surface, allowing wet-out and then working the applied material into the surface and then finishing the concrete normally.

*ASTM C 979 Standard Specification for Pigments for Integrally Colored Concrete* is the applicable standard in the architectural concrete industry and is widely cited in specifications and elsewhere. Many conventional iron oxide, cobalt spinel and chromium (III) oxide pigments were tested for C 979 and were found to comply, but these lack the required IR reflectivity needed to produce high-SRI cementitious systems. Testing for C 979 compliance is difficult and expensive.

The combinations of materials used to manufacture in the laboratory the high-SRI cementitious systems according to the invention, required extensive testing and produced many failures along with successful materials. The applicants had to evaluate all of the effects of combining the candidate pigments with other components of the high-SRI hardener and topping systems to maintain a functional product that would produce the desired qualities in an economical manner. This process required testing well beyond that required for ASTM C 979 conformity.

In addition to the extensive testing and screening of pigment candidates noted above, certain materials are included in the invention to provide specific benefits: (1) Anatase $TiO_2$ in light colored systems provides a means to photo-catalytically help to maintain SRI (or albedo), a novel concept in cementitious hardeners and topping systems; and (2) Barium sulfate in cementitious materials, especially white portland cement based-systems can result in destructive sulfate attack. Generally white portland cements have high C3A contents and are therefore subject to sulfate attack. Experience and extensive testing has allowed of the use of barium sulfate in high SRI toppings that are desired to be dark in color.

Further, general knowledge of pigments as related to coatings technology, a field of knowledge familiar to many, did not prove to have any significant relevance to developing the high SRI cementitious systems and their compatible high SRI pigment components. In general, IR reflective pigments that are made to disperse well in coatings were found to wash out of the high-SRI cementitious systems and risk tracking to adjacent areas, an unacceptable situation in the marketplace.

The compositions, cementitious systems, and methods according to the invention, including toppings and dry-shake color hardeners, may include other materials other modifications as necessary to increase the IR reflectance and to allow higher application rates for dry-shake color-hardeners, and are not limited by the foregoing examples as will be understood by those of skill in the art by reference to this disclosure.

EXAMPLES

General Procedure for Obtaining Spectral Data,

Spectral data were obtained using a Shimadzu UV-3101PC UV-Vis-NIR Scanning Spectrophotometer Serial Number A102841000152, equipped with a 150 mm hemispherical (diffuse) reflectance integrating sphere using a $D_2$ light source from 220-360 nm and halogen lamp from 360-2500 nm along with photomultiplier tube (PMT) detection from 220-830 nm and PbS detection from 830-2500 nm.

Example 1

The Solar Insolation Spectrum

FIG. 1 shows the solar insolation spectrum, at air mass 1.5, zenith angle=48.13°, (typical of the contiguous US) curve from E 891 data, has direct irradiance values of approximately 3% in the UV (<400 nm) region, approximately 37% in the visible (400-700 nm) region, approximately 58.5% in the near infrared (701-2500 nm) region and approximately 1.5% in the mid infrared (>2500 nm) region. ASTM E 903 refers to E 891 50-point selected ordinate method for albedo computations.

These UV, V is, NIR percentages differ from other sources, such as those used by LBNL with E 892 data, 37° tilt, air mass 1.5 and zenith angle 48.13°, which have reported values of approximately 5% in the UV, 43% in the Visible, and 52% in the NIR while omitting the 1.3% in the region above 2500 nm. ASHRAE 2005 reports these percentages as 3% in the ultraviolet, 47% in the visible and 50% in the infrared without stating the wavelength ranges.

Example 2

Black Infrared Reflective Pigments

FIG. 2A is a graph showing conventional black pigments and IR reflective black pigments according to the invention. As shown in FIG. 2A, the reflectance of the black pigments is plotted as % reflectance vs. wavelength from 220 to 2500 nm. The conventional black pigments, iron oxide black and carbon black (Raven $H_2O$, Columbian Chemicals, Marietta, Ga.), both of which are in white portland cement mortar (topping) have very low reflectance across the whole spectrum (220 to 2500 nm) and represent conventional technology. However, as shown in FIG. 2A, the IR reflective pigment system according to the invention using Ferro's GEODE® V-775 and Eclipse™ 10202 in white portland cement mortar (topping), although not nearly as high intensity or jetness as the conventional systems, provide near black colors and excellent overall reflectivity in the IR region. As also shown in FIG. 2A, the IR reflective pigment system according to the invention using perylene black is comparable to the conventional system using carbon black in intensity, yet provides fair albedo and SRI values that could be matched with other higher albedo or SRI colors to meet minimum TSR (albedo) or SRI requirements as needed.

Figure 2B:
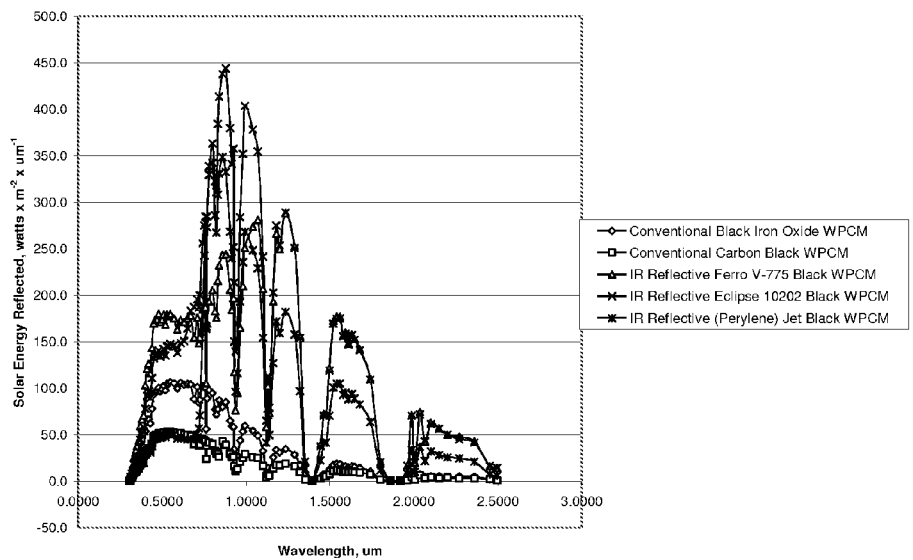
FIG. 2B is a graph of reflected solar energy for conventional black pigmented systems and infrared reflective black pigmented systems according to the embodiment of the invention also shown in FIG. 2A.

FIG. 2B is a graph showing the reflected solar energy of conventional black pigments and IR reflective black pigments according to the invention. As shown in FIG. 2B, the reflected energy is plotted as energy reflected in watts×$m^{-2}$×$um^{-1}$ for each wavelength range. The curves with higher reflectivity in the IR range show similar peaks and valleys as the solar irradiance in FIG. 1 but with much lower values. This chart indicates the significant difference in the spectra of the subject systems with conventional iron oxide black (magnetite) and carbon black compared to the IR reflective CICP spinels and perylene black, an organic pigment. It is noted that the carbon black and iron oxide black are of higher tint strength and can produce a higher jetness black, as compared to perylene black. The CICP IR reflective black systems cannot achieve this level of jetness. Colors such as conventional iron oxide black or carbon black have very low visible and NIR region reflectance, typically 5-10%, so most of the visible region and the infrared region is absorbed and converted to temperature rise. The IR reflective black systems are much cooler in sunlight exposure due to their ability to reflect a sizable portion of the solar insolation at wavelengths from 700 to 2500 nm, the near IR range.

Table 2 below provides the reflectance of each of the black systems at 1000 nm and a value of 40% minimum was selected as pass/fail criteria. The E 1980 Solar Reflectance Index (SRI) was calculated using the Lawrence Berkeley National Laboratory SRI Calculator Tool by R. Levenson from the TSR calculated from the spectral data and ASTM E 903 and E 891 for each mixture. This SRI assumes that concrete and like cementitious materials have a thermal emittance ($\epsilon$) of 0.9 (using an average value in the typical range for concrete from 0.85 to 0.95). As a rough comparison the carbon black in white portland cement mortar (WPCM) has an SRI of 0 which would have a steady state temperature difference much higher as compared to the steady state temperature of the IR reflective Ferro Eclipse™ 10202 Black in WPCM which has an SRI of 45. The CIE L*a*b* color values are also included in this table as well. The L* value represents the lightness or darkness and the carbon black specimen appears to be strongly black with a low L* value. The a* value indicates red (+) or green (−) and the b* value indicates yellow (+) or blue (−). It should be noted that the carbon black in WPCM is comparable to fresh asphalt pavement with a typical albedo value of 0.05 per the Ready Mixed Concrete Industry LEED Reference Guide.

TABLE 2

Black Cementitious Systems Data Table

| Black Pigment Description | IR Reflective Systems & Controls | | | | |
|---|---|---|---|---|---|
| | % Reflectance at 1000 nm (40% minimum) | LBNL Calc SRI % | D65 10° CIE L*a*b* Color | | |
| | | | L* | a* | b* |
| Conventional Black Iron Oxide WPCM* | 9.35 | 6 | 37.38 | 0.17 | −0.27 |
| Conventional Carbon Black WPCM | 4.67 | 0 | 25.97 | −0.10 | 1.02 |
| IR Reflective Ferro V-775 Black WPCM | 40.95 | 38 | 48.39 | 0.25 | −2.53 |
| IR Reflective Eclipse 10202 WPCM | 64.08 | 45 | 43.61 | 1.52 | 0.56 |
| IR Reflective (Perylene) Black WPCM | 42.55 | 24 | 28.38 | −0.88 | −0.60 |

*WPCM = made with white portland cement mortar

Example 3

Red Infrared Reflective Pigments

Figure 3A:
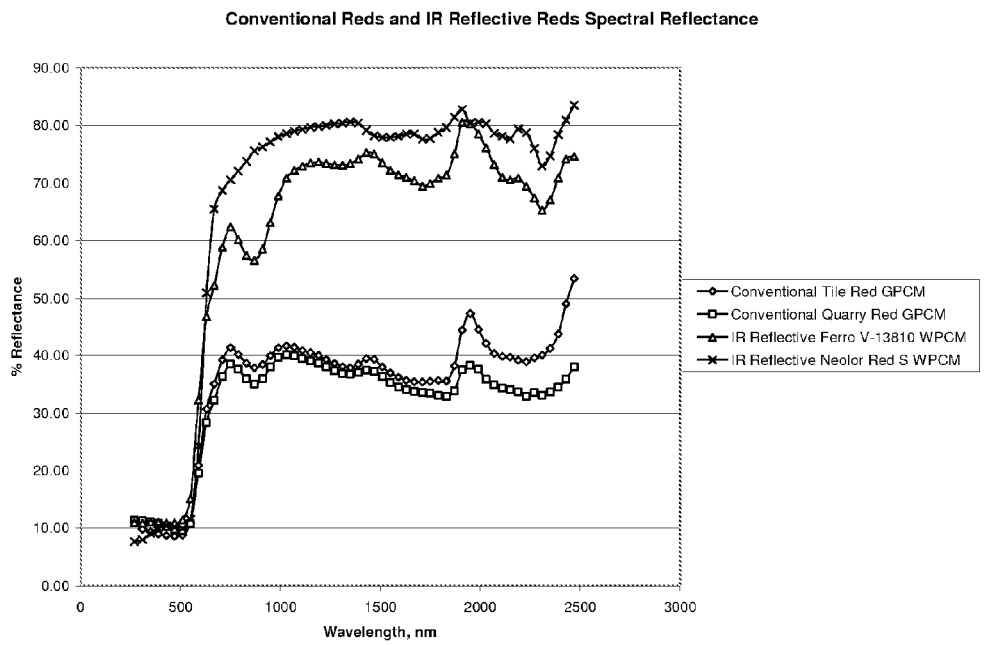
FIG. 3A is a graph of spectral reflectance for conventional red pigmented systems and infrared reflective red pigmented systems according to another embodiment of the invention.

FIG. 3A is a graph showing the spectral reflectance of conventional red pigments and infrared reflective red pigments of the invention. As shown in FIG. 3A, the reflectance of the red pigments is plotted as percent reflectance vs. wavelength from 220 to 2500 nm. This chart indicates that improvements in reflectance can be achieved by selection of a red IR reflective pigment in a topping system or in a dry-shake hardener system. There are significantly lower reflectances for the conventional red integrally-colored mortars, the specimen labeled Tile Red made with gray portland cement as well as the Quarry Red gray portland cement mortar both of which would be typical of the prior art technology.

Figure 3B:
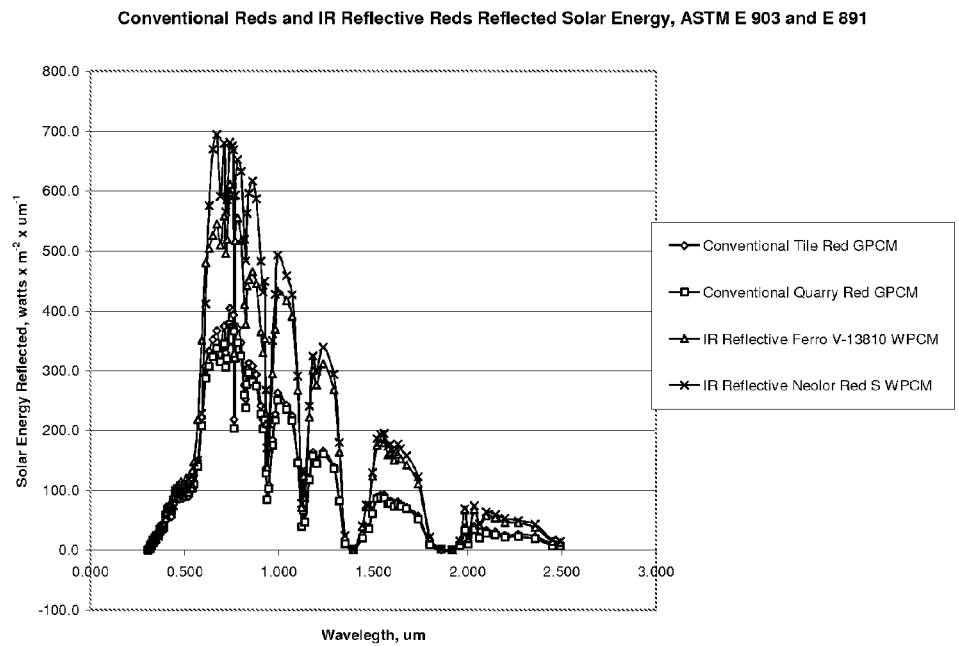
FIG. 3B is a graph of reflected solar energy for conventional red pigmented systems and infrared reflective red pigmented systems according to the embodiment of the invention also shown in FIG. 3A.

FIG. 3B is a graph showing the reflected solar energy of conventional red pigments and infrared reflective red pigments of the invention. As shown in FIG. 3B, the reflected energy of the red pigments is plotted as reflected solar energy in watts$\times$m$^{-2}\times\mu$m$^{-1}$ for each wavelength range. This chart indicates significant differences in the reflected solar energy of the Tile Red and the Quarry Red both in gray portland cement compared to the IR reflective systems based on Ferro's V-13810 and Rhodia's Neolor™ Red S in white portland cement mortars.

Table 3 below, as in Table 2 above, shows the data for the red colored systems, and provides the reflectance of each specimen at 1000 nm and a value of 50% minimum was selected as pass/fail criteria. The ASTM E 1980 SRI values are calculated and the L*a*b* color values for the red colored systems are reported. The SRI values of the Tile Red and Quarry Red in gray portland are just over the minimum LEED SRI requirement of 29%. The IR-reflective formulations with Ferro V-13810 and Rhodia Neolor™ Red S allow an increase in SRI of 20-25%, perhaps enough to qualify for an exemplary credit under the LEED system.

TABLE 3

Red Cementitious Systems Data Table

| Red Pigment Description | Red Controls and IR Red Systems | | | | |
|---|---|---|---|---|---|
| | % Reflectance @ 1000 nm (50% Minimum) | LBNL Calc SRI | D65 10° CIE L*a*b* Color | | |
| | | | L* | a* | b* |
| Conventional Tile Red GPCM** | 39.84 | 33 | 46.18 | 26.68 | 16.68 |
| Conventional Quarry Red GPCM | 38.47 | 31 | 45.73 | 27.49 | 17.59 |
| IR Reflective Ferro V-13810 WPCM | 73.45 | 58 | 53.16 | 31.61 | 23.08 |
| IR Reflective Neolor Red S WPCM | 79.70 | 66 | 49.86 | 34.23 | 15.99 |

**GPCM = made with gray portland cement mortar

Example 4

Yellow Infrared Reflective Pigments

Figure 4A:
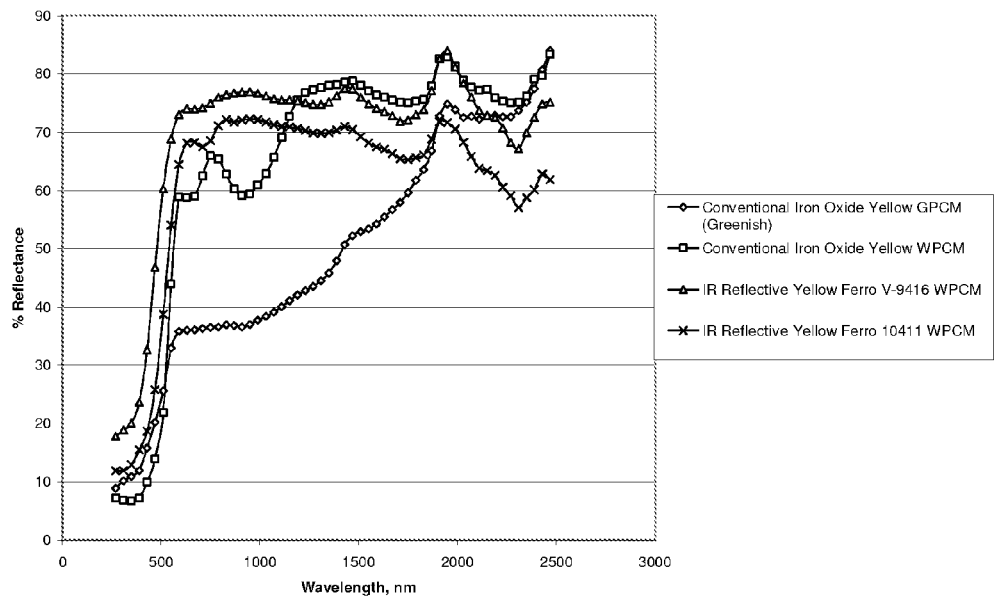
FIG. 4A is a graph of spectral reflectance for conventional yellow pigmented systems and infrared reflective yellow pigmented systems according to another embodiment of the invention.

FIG. 4A is a graph showing the spectral reflectance of conventional yellow pigments and infrared reflective yellow pigments of the invention. As shown in FIG. 4A, the reflectance of the yellow pigments is plotted as percent reflectance vs. wavelength from 220 nm to 2500 nm. The use of conventional iron oxide yellow pigment in a gray portland cement shifts the yellow to a greenish color that is not very reflective. Normally the iron oxide yellow could provide moderate IR reflectivity in a white portland cement mortar, but the use of IR reflective pigments in the subject toppings and dry-shake hardeners will provide significant improvements in albedo and SRI and will also provide a more pleasing, cleaner and brighter range of yellow colors.

Figure 4B:
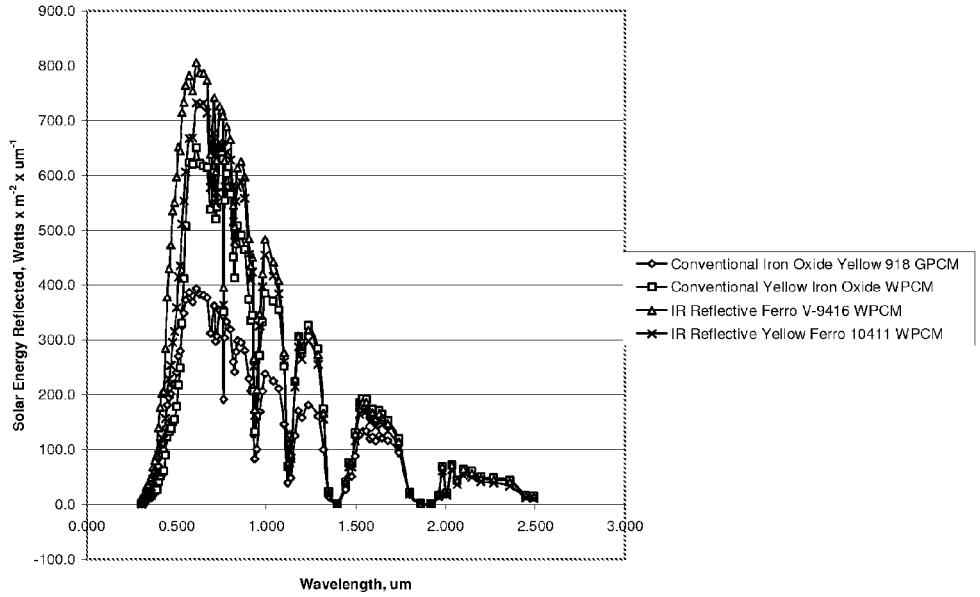
FIG. 4B is a graph of reflected solar energy for conventional yellow pigmented systems and infrared reflective yellow pigmented systems according to the embodiment of the invention also shown in FIG. 4A.

FIG. 4B is a graph showing the reflected solar energy of conventional yellow pigments and infrared reflective yellow pigments of the invention. As shown in FIG. 4B, the reflected energy of the yellow pigments is plotted as reflected solar energy in watts per square metre per μm for each wavelength range from 220 nm to 2500 nm. This chart illustrates the improvement that is possible with proper yellow IR reflective pigment selection.

Table 4 below, as in Table 2 above, shows the data for the yellow systems, and provides the reflectance at 1000 nm, with a value of 65% selected as the pass/fail criteria. The computed SRI values and the measured L*a*b* color values for the yellow colored systems are reported. The conventional yellow iron oxide in white portland cement can provide a fairly good albedo and SRI values, however, these values can be increased by 5-15% by selecting a more IR reflective yellow system.

TABLE 4

Yellow Cementitious Systems Data Table

| | IR Reflective Systems & Control | | | | |
|---|---|---|---|---|---|
| | % Reflectance @ 1000 nm (65% | LBNL Calc | D65 10° CIE L*a*b* Color | | |
| Yellow Pigment Description | Minimum) | SRI | L* | a* | b* |
| Conventional Iron Oxide Yellow GPCM*** | 37.75 | 42 | 65.71 | 2.21 | 23.64 |
| Conventional Iron Oxide Yellow WPCM | 61.30 | 66 | 81.13 | 7.46 | 31.95 |
| IR Reflective Yellow Ferro V-9416 WPCM | 76.49 | 84 | 84.84 | −1.77 | 26.42 |
| IR Reflective Yellow Ferro 10411 WPCM | 72.01 | 73 | 77.90 | 6.29 | 38.62 |

***Conventional iron oxide yellow in gray portland cement is a greenish-yellow shade and is not very bright. White portland cement is required to provide a bright yellow.

Example 5

Brown and Beige Infrared Reflective Pigments

Figure 5A:
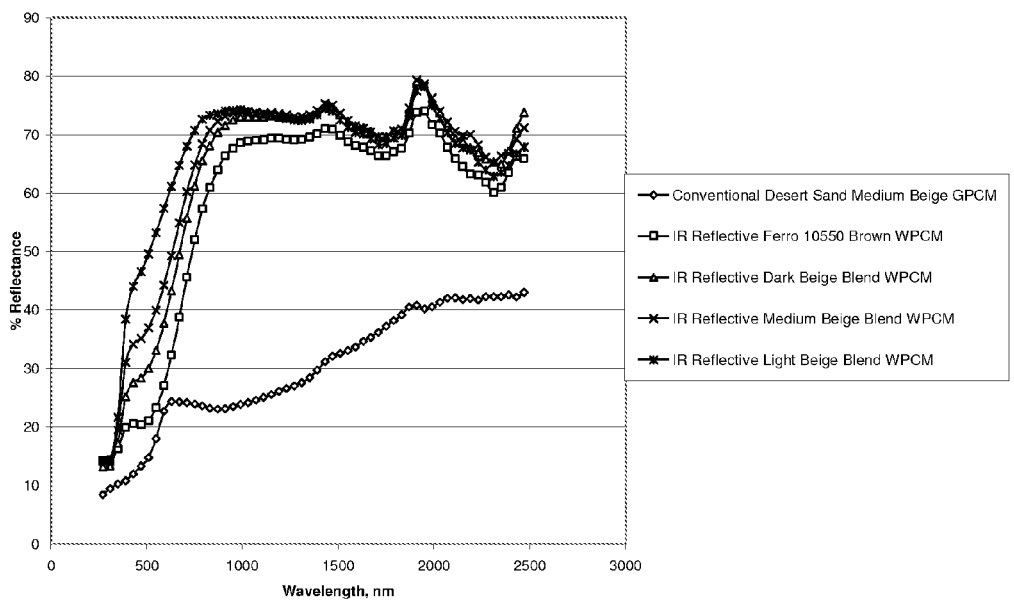
FIG. 5A is a graph of spectral reflectance for conventional beige pigmented systems and infrared reflective brown and beige pigmented systems according to another embodiment of the invention.

FIG. 5A is a graph showing the spectral reflectance of conventional beige pigments and infrared reflective brown and beige pigments of the invention. FIG. 5A shows the reflectance of the conventional beige Desert Sand is in gray portland cement (mortar/topping) because that is the way it is normally done. The IR-reflective Ferro 10550 brown is also a beige color but is in white portland cement. The reflectance curves in IR region demonstrate the value of using the IR reflective pigments in white portland cement systems over conventional pigments in a gray portland cement system.

Figure 5B:
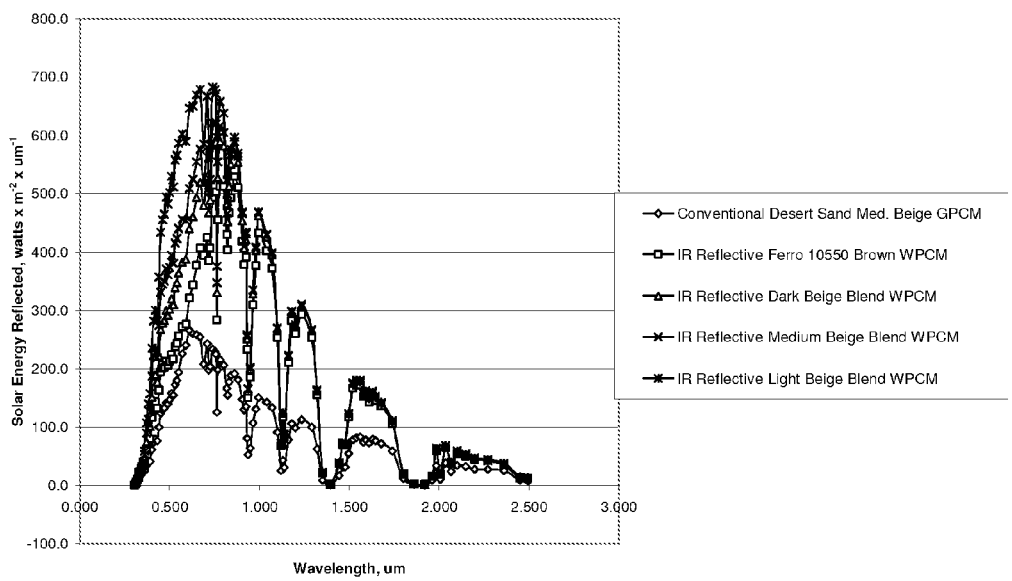
FIG. 5B is a graph of reflected solar energy for conventional beige pigmented systems and infrared reflective brown and beige pigmented systems according to the embodiment of the invention also shown in FIG. 5A.

FIG. 5B is a graph showing the reflected solar energy of conventional beige pigments and infrared reflective brown and beige pigments of the invention. As shown in FIG. 5B, the conventional pigments used to achieve brown or beige colors, such as Desert Sand made with iron oxides and gray portland cement will result in reductions of solar reflectivity as compared to gray portland cement concrete. However, the spectrum of IR reflective CICP pigments, such as Ferro 10550 Brown and the beige colors provide very good solar reflectivity. Further, adding Ferro 10411 Bright Golden Yellow and Anatase to the Ferro 10550 Brown in various ratios, combines to provide a range of clean beige colors with both high albedo and SRI characteristics. Accordingly, infrared pigments of the invention may be combined to produce unique colors, which also have high albedo and SRI.

Table 5 below, as in Table 2 above, shows the data for the Beige (Brown) systems, and provides the reflectance at 1000 nm, with a value of 60% minimum selected as pass/fail criteria. The computed SRI values and the measured L*a*b* color values for the beige (brown) colored systems are reported. This table indicates that the albedo and/or SRI can be more than doubled by using an IR reflective system (dry-shake color hardener or topping).

TABLE 5

Beige (Brown) Cementitious Systems Data Table

| | IR Reflective Systems & Control | | | | |
|---|---|---|---|---|---|
| Brown-Beige Pigment Description | % Reflectance @ 1000 nm (60% Minimum) | LBNL Calc SRI | D65 10° CIE L*a*b* Color | | |
| | | | L* | a* | b* |
| Conventional Desert Sand Medium Beige GPCM | 23.80 | 24 | 52.00 | 6.73 | 10.46 |
| IR Reflective Ferro 10550 Brown WPCM | 68.68 | 56 | 56.63 | 8.74 | 7.76 |
| IR Reflective Dark Beige Blend WPCM | 73.10 | 66 | 65.40 | 7.03 | 7.76 |
| IR Reflective Medium Beige Blend WPCM | 74.01 | 70 | 70.15 | 5.84 | 8.26 |
| IR Reflective Light Beige Blend WPCM | 74.18 | 78 | 77.72 | 3.73 | 8.82 |

Example 6

Infrared Reflective Green Pigments

Figure 6A:
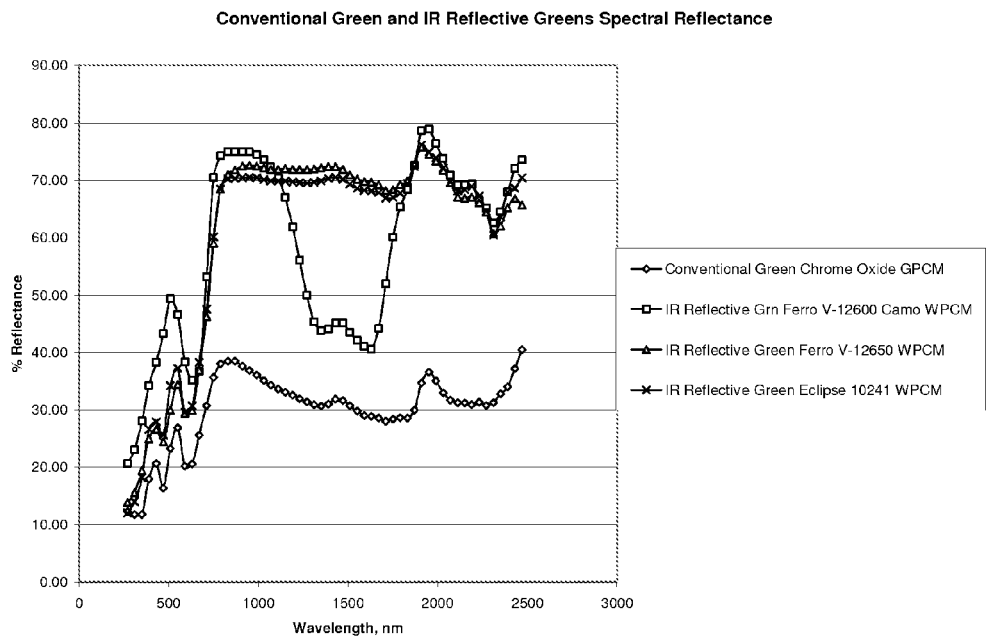
FIG. 6A is a graph of spectral reflectance for conventional green pigmented systems and infrared reflective green pigmented systems according to another embodiment of the invention.

FIG. 6A is a graph showing the spectral reflectance of conventional green pigments and infrared reflective green pigments of the invention. As shown in FIG. 6A, conventional green chromium oxide in gray portland cement is fair in reflectivity across the NIR range. However, green IR-reflective pigments in white portland cement provide significant improvements in the NIR range. The spectrum of Ferro V-12600 Camo Green shows the typical cobalt trough absorbing strongly from about 1200 to 1800 nm, but it still provides better overall reflectivity than gray portland cement concrete with conventional chromium oxide pigment.

Figure 6B:
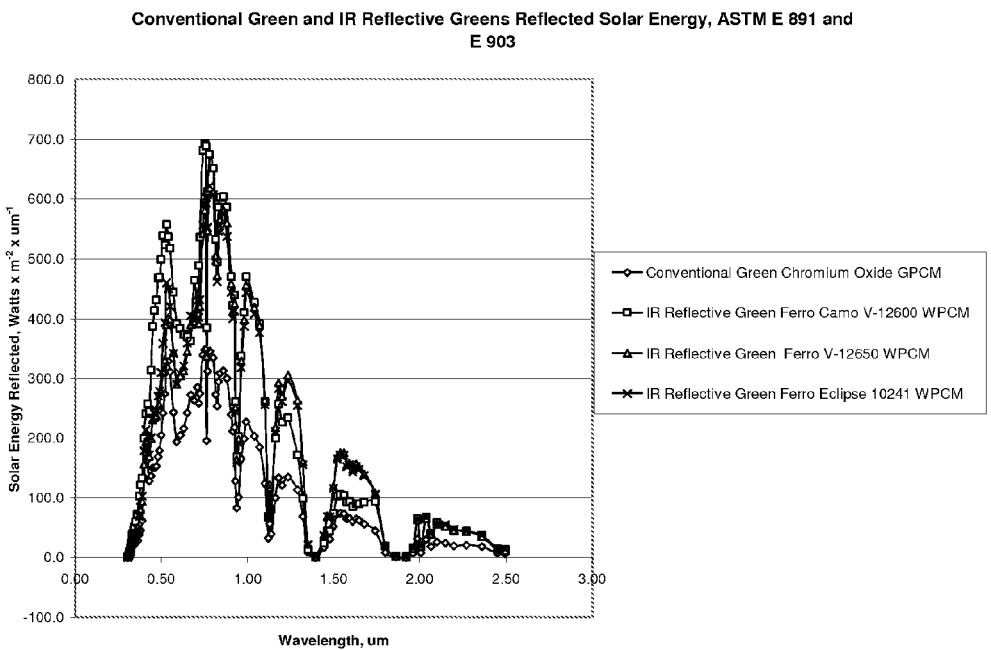
FIG. 6B is a graph of reflected solar energy for conventional green pigmented systems and infrared reflective green pigmented systems according to the embodiment of the invention also shown in FIG. 6A.

FIG. 6B is a graph showing the reflected solar energy of conventional green pigments and infrared reflective green pigments of the invention. As shown in FIG. 6B, conventional green chromium oxide in gray portland cement has the lowest solar energy reflected. The effect of the typical cobalt trough in the V-12600 spectra from 1.200 to 1.800 μm does not impact the value very much due to the low solar intensity in this spectral range (FIG. 1).

Table 6 below, as in Table 2 above, shows the data for the green systems, providing the reflectance at 1000 nm, with a value of 60% minimum selected as pass/fail criteria. The computed SRI values and the measured L*a*b* color values are reported. This table indicates that in some cases the albedo (TSR) can almost be doubled and the SRI can be doubled in all cases although the green color is noted to be generally less intense with the IR reflective systems.

TABLE 6

Green Cementitious Systems Data Table

| | IR Reflective Systems & Control | | | | |
|---|---|---|---|---|---|
| Green Pigment Description | % Reflectance @ 1000 nm (60% Minimum) | LBNL Calc SRI | D65 10° CIE L*a*b* Color | | |
| | | | L* | a* | b* |
| Conventional Chrome Oxide Green GPCM | 35.81 | 31 | 55.53 | −10.23 | 11.17 |
| IR Reflective Green Ferro Camo V-12600 WPCM | 74.34 | 66 | 71.09 | −13.54 | 3.17 |

TABLE 6-continued

Green Cementitious Systems Data Table

IR Reflective Systems & Control

| Green Pigment Description | % Reflectance @ 1000 nm (60% Minimum) | LBNL Calc SRI | D65 10° CIE L*a*b* Color | | |
|---|---|---|---|---|---|
| | | | L* | a* | b* |
| IR Reflective Green Ferro V-12650 WPCM | 72.34 | 62 | 62.28 | −5.60 | 9.56 |
| IR Reflective Ferro Green Eclipse 10241 WPCM | 70.28 | 62 | 64.93 | −10.62 | 10.77 |

Example 7

Infrared Reflective Blue Pigments

Figure 7A:
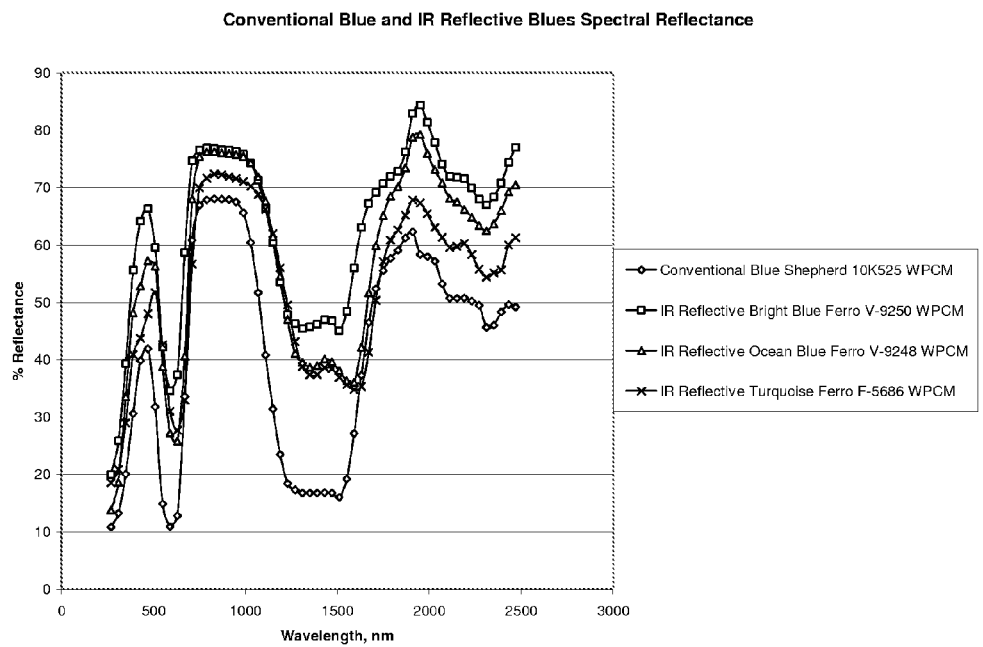
FIG. 7A is a graph of spectral reflectance for conventional blue pigmented systems and infrared reflective blue pigmented systems according to another embodiment of the invention.

FIG. 7A is a graph showing the spectral reflectance of conventional blue pigments and infrared reflective blue pigments of the invention. As shown in FIG. 7A, the conventional blue pigment falls significantly below the IR reflective pigments in the visual and NIR wavelength ranges, indicating that the IR reflective systems can improve the albedo (TSR) and SRI over what can be achieved in like cementitious systems using conventional cobalt blue pigments.

Figure 7B:
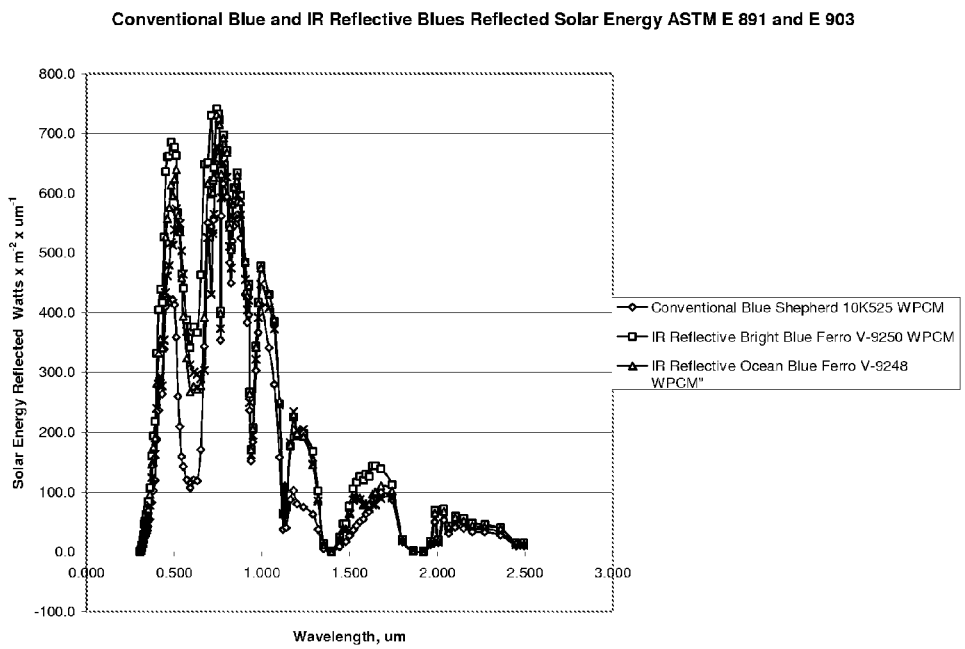
FIG. 7B is a graph of reflected solar energy for conventional blue pigmented systems and infrared reflective blue pigmented systems according to the embodiment of the invention also shown in FIG. 7A.

FIG. 7B is a graph showing the reflected solar energy of conventional blue pigments and infrared reflective blue pigments of the invention. As shown in FIG. 7B, the conventional blue pigments used in concrete are cobalt blues, either cobalt chromite or cobalt aluminate spinels. There are some differences in the IR reflectance and visible reflectance of these commercial blue pigments, e.g. Shepherd 10K525, and the IR reflective blue pigments. All of these cobalt blue pigments exhibit the typical cobalt trough, a strong absorbance from about 1.200 to 1.800 μm.

Table 7 below, as in Table 2 above, shows the data for the blue systems, and provides the reflectance at 1000 nm with a value of 50% minimum selected as pass/fail criteria. The computed SRI values and the measured L*a*b* color values for the blue systems are reported. The blue systems chart indicates that the although conventional blue pigment in a white portland cement system can provide fairly good albedo (TSR) and SRI, use of an IR reflective blue or blue-green pigment can provide significantly better albedo (TSR) and SRI values.

TABLE 7

Blue Cementitious Systems Data Table

IR Reflective Systems & Controls

| Blue Pigment Description | % Reflectance @ 1000 nm (50% Minimum) | LBNL Calc SRI | D65 10° CIE L*a*b* Color | | |
|---|---|---|---|---|---|
| | | | L* | a* | b* |
| Conventional Blue Shepherd 10K525 WPCM | 21.24 | 47 | 50.44 | −5.10 | −32.35 |
| IR Reflective Bright Blue V-9250 WPCM | 51.40 | 74 | 72.78 | −7.55 | −19.75 |
| IR Reflective Ocean Blue V-9248 WPCM | 52.70 | 67 | 69.38 | −17.46 | −16.94 |

TABLE 7-continued

Blue Cementitious Systems Data Table

IR Reflective Systems & Controls

| Blue Pigment Description | % Reflectance @ 1000 nm (50% Minimum) | LBNL Calc SRI | D65 10° CIE L*a*b* Color | | |
|---|---|---|---|---|---|
| | | | L* | a* | b* |
| IR Reflective Blue-Green Ferro F-5686 WPCM | 54.20 | 62 | 53.68 | 26.34 | −7.07 |

Example 8

Gray and White Infrared Reflective Pigments

Figure 8A:
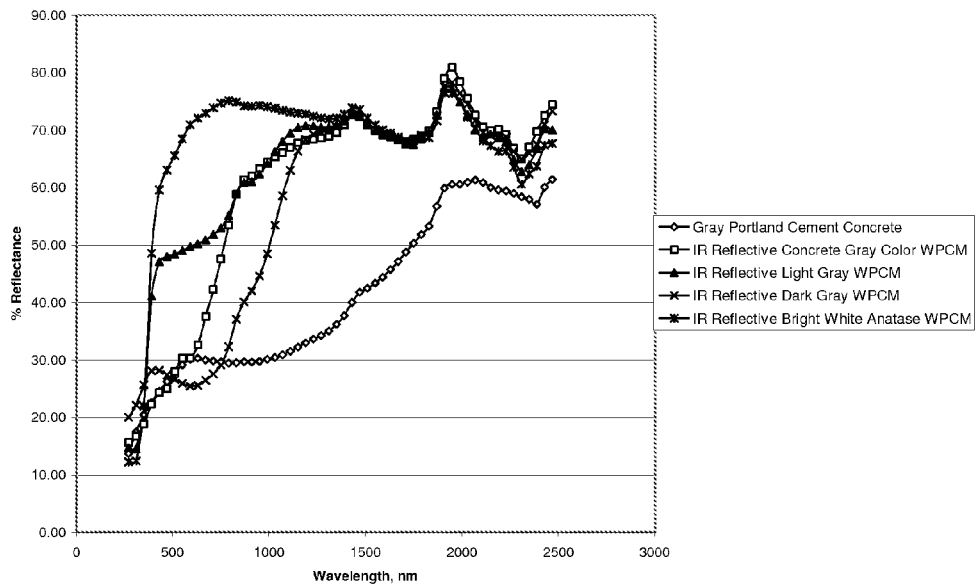
FIG. 8A is a graph of spectral reflectance for gray portland cement concrete and infrared reflective gray and white pigmented systems according to another embodiment of the invention.

FIG. 8A is a graph showing the spectral reflectance of gray portland cement concrete and infrared reflective gray and white pigments of the invention. In FIG. 8A, the gray portland cement concrete reflectance spectra is compared to a similar concrete gray color of IR reflective white portland cement mortar, IR Light Gary and IR Dark Gray and Bright White Anatase-pigmented white portland cement mortar. The gray and white infrared reflective pigments of the invention show a greater percent reflectance across the majority of the spectrum.

Figure 8B:
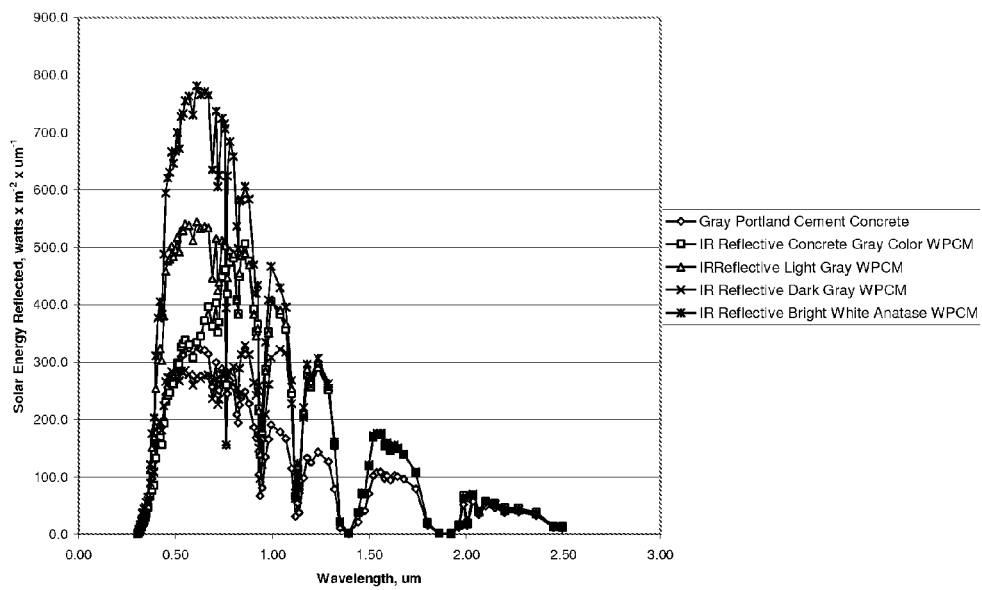
FIG. 8B is a graph of reflected solar energy for gray portland cement concrete and infrared reflective gray and white pigmented systems according to the embodiment of the invention also shown in FIG. 8A.

FIG. 8B is a graph showing the reflected solar energy of gray portland cement concrete and infrared reflective gray and white pigments of the invention. In FIG. 8B, the solar reflected energy of the gray portland cement concrete is compared to a similar IR reflective concrete gray colored WPCM, IR Reflective Light Gray WPCM, IR Reflective Dark Gray WPCM, and IR Reflective Bright White WPCM. The gray and white pigments of the invention show greater reflected solar energy than gray portland cement concrete.

Table 8 below, as in Table 2 above, shows the data for the gray-white systems, and provides the reflectance at 1000 nm, with a value of 60% minimum selected as pass/fail criteria. The computed SRI values and the measured L*a*b* color values for the gray-white systems are reported. This table indicates that an IR-reflective color similar to gray portland cement concrete can provide a measurable improvement in TSR (albedo) and SRI over conventional gray portland cement concrete and that IR Reflective Light and Dark Gray WPCMs can provide improvements in SRI over what is possible with gray portland cement concrete. The IR Reflective Anatase Bright White WPCM is the highest overall TSR (albedo) and SRI of any of the tested systems, although the IR reflective Yellow Ferro V-9416 in FIG. 6A is very close to the anatase values.

TABLE 8

Gray, White Cementitious Systems Data Table

IR Reflective Systems & Controls

| Gray, White or Pigment Description | % Reflectance @ 1000 nm (60% Minimum) | LBNL Calc SRI | D65 10° CIE L*a*b* Color | | |
|---|---|---|---|---|---|
| | | | L* | a* | b* |
| Ordinary Gray Portland Cement Concrete No Pigment | 33.22 | 36 | 61.72 | −0.09 | 4.66 |

TABLE 8-continued

Gray, White Cementitious Systems Data Table

| Gray, White or Pigment Description | % Reflectance @ 1000 nm (60% Minimum) | LBNL Calc SRI | D65 10° CIE L*a*b* Color | | |
|---|---|---|---|---|---|
| | | | L* | a* | b* |
| IR Reflective Gray Portland Cement Colored WPCM | 68.30 | 57 | 61.72 | 0.25 | 7.85 |
| IR Reflective Light Gray (Anatase + V-775) WPCM | 70.84 | 68 | 76.80 | 0.54 | 1.95 |
| IR Reflective Dark Gray (BaSO4 + V-775) WPCM | 68.72 | 47 | 57.83 | 0.07 | −2.59 |
| IR Reflective Bright White Anatase WPCM | 72.63 | 86 | 87.03 | 1.12 | 5.58 |

Although the present invention has been discussed in considerable detail with reference to certain preferred embodiments, other embodiments are possible. Therefore, the scope of the appended claims should not be limited to the description of preferred embodiments contained herein.

What is claimed is:

1. A cementitious system comprising:
an infrared reflective pigment composition comprising
i) one or more infrared reflective pigments, wherein at least one of the one or more infrared reflective pigments is a beige to brown infrared reflective pigment having a percent reflectance at 1000 nanometers of at least 60% as measured in white portland cement mortar, and is selected from the group consisting of, chrome antimony titanium rutiles, chromium iron oxide spinels, chrome niobium rutiles, chrome tungsten titanium rutiles, iron chromite spinels, iron titanium spinels, manganese antimony titanium rutiles, manganese tungsten titanium rutiles, zinc ferrite spinels, and zinc iron chromite spinels; and
ii) a cementitious matrix comprising cement and aggregates, wherein the cementitious system is colored with pigments compliant with ASTM C979.

2. The cementitious system according to claim 1 wherein at least one of the beige to brown infrared reflective pigments is a beige to brown infrared reflective pigment having a solar Reflectance Index of at least 56% as measured in white portland cement mortar, and computed from the albedo value using the Stefan-Boltzman constant, $5.67\ E^{-8}$ watts*m$^{-2}$*K$^{-4}$ and a normally assigned emittance ($\epsilon$) value of $\epsilon=0.90$.

3. The cementitious system according to claim 1 wherein the beige to brown infrared reflective pigment is a manganese antimony titanium rutile.

4. The cementitious system according to claim 1 further comprising one or more red, orange, or yellow infrared reflective pigments.

5. The cementitious system according to claim 1 wherein the cementitious system further comprises anatase.

6. The cementitious system according to claim 1 wherein the beige to brown infrared reflective pigments are combined with one or more pigments selected from the group consisting of black infrared reflective pigments, red infrared pigments, orange to yellow infrared reflective pigments, green infrared reflective pigments, blue infrared reflective pigments, and gray-white infrared reflective pigments in the cementitious system to form an intermediate colored cementitious system.

7. The cementitious system according to claim 1 wherein the cementitious matrix further comprises cementitious materials to form a dry shake color hardener.

8. The cementitious system according to claim 1 wherein the cementitious matrix further comprises cementitious materials to form a topping.

9. The cementitious system according to claim 1 wherein the beige to brown infrared reflective pigment is a chrome antimony titanium rutile.

10. The cementitious system according to claim 1 wherein the beige to brown infrared reflective pigment is a chromium iron oxide spinel.

11. The cementitious system according to claim 1 wherein the beige to brown infrared reflective pigment is a chrome niobium rutile.

12. The cementitious system according to claim 1 wherein the beige to brown infrared reflective pigment is a chrome tungsten titanium rutile.

13. The cementitious system according to claim 1 wherein the beige to brown infrared reflective pigment is an iron chromite spinel.

14. The cementitious system according to claim 1 wherein the beige to brown infrared reflective pigment is an iron titanium spinel.

15. The cementitious system according to claim 1 wherein the beige to brown infrared reflective pigment is a manganese tungsten titanium rutile.

16. The cementitious system according to claim 1 wherein the beige to brown infrared reflective pigment is a zinc ferrite spinel.

17. The cementitious system according to claim 1 wherein the beige to brown infrared reflective pigment is a zinc iron chromite spinel.

18. The cementitious system according to claim 1 wherein the beige to brown infrared reflective pigment is selected from the group consisting of pigment brown 24, pigment brown 29, pigment brown 33, pigment yellow 119, pigment yellow 162, pigment yellow 163, pigment yellow 164, and pigment black 12.

19. A composition for creating a colored cementitious material, comprising:
(a) cement; and
(b) one or more infrared reflective pigments, wherein at least one of the one or more infrared reflective pigments is a beige to brown infrared reflective pigment having a percent reflectance at 1000 nanometers of at least 60% as measured in white portland cement mortar, and is selected from the group consisting of chrome antimony titanium rutiles, chromium iron oxide spinels, chrome niobium rutiles, chrome tungsten titanium rutiles, iron chromite spinels, iron titanium spinels, manganese antimony titanium rutiles, manganese tungsten titanium rutiles, zinc ferrite spinels, and zinc iron chromite spinels; and
(c) cementitious materials comprising admixtures, fillers, pozzolans, and silica fine aggregates.

20. The composition according to claim 19 wherein the colored cementitious material further comprises one or more red, orange, or yellow infrared reflective pigments.

21. A method of preparing a colored concrete comprising:
(a) providing a cement and aggregates; and
(b) adding one or more infrared reflective pigments to the cement, wherein at least one of the one or more infrared reflective pigments is a beige to brown infrared reflective pigment having a percent reflectance at 1000 nanometers of at least 60% as measured in white portland cement mortar, and is selected from the group consisting of, chrome antimony titanium rutiles, chromium iron oxide spinels, chrome niobium rutiles, chrome tungsten titanium rutiles, iron chromite spinels, iron titanium spinels, manganese antimony titanium rutiles, manganese tungsten titanium rutiles, zinc ferrite spinels, and zinc iron chromite spinels.

22. A method according to claim 21 wherein the one or more infrared reflective pigments further comprises one or more red, orange, or yellow infrared reflective pigments.

23. The method according to claim 21 wherein the one or more infrared reflective pigments are added to the cement in the form of a topping for applying to hardened concrete.

24. The method according to claim 21 wherein the one or more infrared reflective pigments are added to the cement in the form of a dry-shake color hardener for applying to freshly placed concrete.

* * * * *